United States Patent
Sumida et al.

(10) Patent No.: US 7,400,243 B2
(45) Date of Patent: Jul. 15, 2008

(54) COMMUNICATION APPARATUS FOR VEHICLE

(75) Inventors: Masato Sumida, Tokyo (JP); Masayoshi Ono, Tokyo (JP); Tetsuya Ooba, Tokyo (JP); Masahiko Katayama, Tokyo (JP); Naohisa Uehara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 334 days.

(21) Appl. No.: 11/304,812

(22) Filed: Dec. 16, 2005

(65) Prior Publication Data

US 2006/0290503 A1 Dec. 28, 2006

(30) Foreign Application Priority Data

| | | |
|---|---|---|
| Jun. 28, 2005 | (JP) | 2005-188179 |
| Jul. 8, 2005 | (JP) | 2005-200738 |
| Jul. 8, 2005 | (JP) | 2005-200741 |

(51) Int. Cl.
*G08B 1/08* (2006.01)

(52) U.S. Cl. .............. 340/539.11; 340/572.1; 340/426.17

(58) Field of Classification Search ........... 340/572.1, 340/572.4, 539.11, 539.13, 539.14, 539.21, 340/539.23, 426.13, 426.16, 426.17; 455/456.1, 455/517; 701/211, 513
See application file for complete search history.

(56) References Cited

U.S. PATENT DOCUMENTS

| | | | | |
|---|---|---|---|---|
| 6,553,313 | B1* | 4/2003 | Froeberg ................. | 701/213 |
| 6,574,482 | B1* | 6/2003 | Radomsky et al. ........ | 455/517 |
| 7,145,507 | B2* | 12/2006 | Luo et al. ............... | 342/357.08 |

FOREIGN PATENT DOCUMENTS

| | | |
|---|---|---|
| JP | 08-013874 A | 1/1996 |
| JP | 10-059131 A | 3/1998 |
| JP | 11-241539 A | 9/1999 |
| JP | 2001-003616 A | 1/2001 |
| JP | 2003-221954 A | 8/2003 |
| JP | 2003-239590 | 8/2003 |
| JP | 2005-076359 | 3/2005 |
| WO | WO 01/32480 A1 * | 5/2001 |

OTHER PUBLICATIONS

Klaus Finkenzeller, "RFID Handbook: Fundamentals and Applications in Contactless IC Cards", ISBN 4-526-05291-4, Published by Nikkan Koyo ShinbunCo., Translated by Software Engineer Laboratory (SOFEL), 2nd Printing, May 2004, pp. 110-129.
Japanese Communications dated Feb. 4, 2008.

* cited by examiner

*Primary Examiner*—Van T. Trieu
(74) *Attorney, Agent, or Firm*—Sughrue Mion, PLLC

(57) ABSTRACT

A communication apparatus for a vehicle can achieve an inexpensive technique for determining whether a portable unit exists inside or outside the vehicle without depending upon LF band radio waves through contactless communication using high frequency band radio waves by separating a reader function of a reader/writer into the portable unit and an on-board unit. The apparatus includes at least one ID transmitter installed on a vehicle and sends a transmitter ID possessed by itself in response to reception of a radio wave, an on-board unit installed on the vehicle for radiating a radio wave to the ID transmitter, a portable unit that receives the transmitter ID sent by the ID transmitter, and an ID communication section for sending the transmitter ID from the portable unit 3 to the on-board unit. The on-board unit determines the position of the portable unit based on the transmitter ID received from the portable unit.

29 Claims, 14 Drawing Sheets

COMMUNICATION APPARATUS FOR VEHICLE

BACKGROUND OF THE INVENTION

1. Field of the Invention

The present invention relates to a communication apparatus for a vehicle having a function of locating a portable unit in an electronic key system, and more particularly, it relates to such a vehicular communication apparatus suitable when applied to a passive entry technique to operate the locking and unlocking of the doors of a vehicle only with the portable unit in a simple and easy manner.

2. Description of the Related Art

In the past, as a communication apparatus for remotely controlling equipment mounted on a motor vehicle, it has been proposed a vehicular communication apparatus that has a function to automatically unlock the doors of the vehicle when a user carrying a portable unit is approaching the vehicle and to automatically lock the vehicle doors when the user is going away from the vehicle.

In such a known apparatus, however, a certain measure is taken not to lock the doors in an automatic fashion so as to prevent the portable unit from being confined to the vehicle when the portable unit is present therein. As a result, when the user is away from the vehicle with the portable unit left behind in the vehicle, the doors will remain unlocked, thus giving rise to a problem from the viewpoint of crime prevention.

Accordingly, in case where the user is going away from the vehicle with the portable unit being left therein, it is necessary to inform the user of such a state. In other words, a function is required to make a determination as to whether the portable unit exists inside or outside the vehicle.

As a technique to determine whether the portable unit is present in the vehicle or not (hereinafter, referred to as a "vehicle inside and outside determination technique"), there has been proposed a communication apparatus for a vehicle that uses an LF band radio wave of a frequency of about 120 KHz-135 KHz level, for instance (see, for example, a first patent document: Japanese patent application laid-open No. 2003-221954).

According to such a vehicle inside and outside determination technique using the LF band radio wave, antennas to radiate an LF band radio wave (hereinafter, referred to as an "LF band antenna") are placed in various locations of the vehicle and connected to a on-board unit through wires or cables so that electric power and a predetermined frequency are supplied to the LF band antenna, respectively.

In addition, it is designed so that the portable unit is responsive to a radio wave radiated from the LF band antennas when the portable unit exists in a place in which the radio wave has a predetermined magnetic field strength or above, and the on-board unit makes a determination as to the existence of the portable unit based on a response from the portable unit to a designated LF band antenna.

On the other hand, an RFID (Radio Frequency IDentification) technique is known as a technique to detect an object by using radio waves (see, for instance, a non-patent first document: "RFID Handbook, second edition, Principle and Application of Contactless IC Card (ISBN 4-526-05291-4)" (written by Klaus Finkenzeller, translated by Soft Engineering Laboratory, published by Nikkan kogyo Shinbun Co.)).

As techniques for RFID, there are a lot of ones that are called by a variety of names such as a wireless IC tag, an IC tag, an RF tag, an ID tag, and so on.

The RFID system typically comprises an RF tag and a reader writer, and when a radio wave is radiated from the reader writer to the RF tag with both of them being present within a communicable range, an ID signal is sent from the RF tag so that the reader writer receives the ID signal and is able to obtain the existence of the RF tag and information according to the ID signal.

In the known communication apparatus for a vehicle, since LF band antennas for remote control are connected to the on-board unit through wires or cables, the arrangement or routing of wiring is needed, thus posing a problem that a large amount of labor is required for installation.

Particularly, since a determination as to whether the portable unit is present inside the vehicle is made by the use of LF band waves, there is a problem that the arrangement or routing of wiring to the LF band antennas becomes complicated, and the size of the LF band antennas is large, thus limiting mounting places thereof.

Moreover, since an LF band antenna is generally comprised of a coil with a conductor wrapped around a core that is composed of ferrite, etc., there are the following problems. That is, the reduction in size thereof is difficult, and the locations of installation of LF band antennas are limited according to the size of each antenna. In addition, there are constraints on the condition of arrangement and designing of antennas that are able to fulfill a satisfactory communication function without impairing the design of the vehicle.

Further, there is also the following problem. That is, though a plurality of antennas are needed so as to cover the entire area of the passenger compartment of the vehicle by using LF band radio waves, the cost of each single antenna unit is high because of the above-mentioned construction of each LF band antenna, and it is difficult to do cost reduction thereof, so the entire cost is increased due to an increase in the number of antennas used.

SUMMARY OF THE INVENTION

The present invention is intended to solve the problems as referred to above, and has for its object to obtain a communication apparatus for a vehicle which is capable of achieving an inexpensive technique for determining whether a portable unit is present inside or outside the vehicle without depending upon LF band radio waves by applying a contactless communication technique using high frequency band radio waves in place of LF band radio waves and by separating a reader function of a reader/writer into the portable unit and an on-board unit.

Another object of the present invention is to obtain a communication apparatus for a vehicle which is capable of achieving an inexpensive technique for determining whether a portable unit is present inside or outside the vehicle without depending upon LF band radio waves by applying a contactless communication technique using high frequency band radio waves in place of LF band radio waves and by providing the portable unit with a reader function of a high frequency band RF tag.

A further object of the present invention is to obtain a communication apparatus for a vehicle which is capable of achieving an inexpensive technique for determining whether a portable unit is present inside or outside the vehicle without depending upon LF band radio waves by applying a contactless communication technique using high frequency band radio waves in place of LF band radio waves and separating a reader function of a conventional RF tag into the portable unit and an on-board unit.

A communication apparatus for a vehicle according to a first aspect of the present invention includes: at least one ID transmitter that is installed on a vehicle and sends a transmitter ID possessed by itself in response to reception of a radio wave; an on-board unit that is installed on the vehicle and radiates the radio wave to the ID transmitter; a portable unit that receives the transmitter ID sent by the ID transmitter; and an ID communication section that sends the transmitter ID from the portable unit to the on-board unit. The on-board unit determines the position of the portable unit based on the transmitter ID received from the portable unit.

A communication apparatus for a vehicle according to a second aspect of the present invention includes: at least one ID transmitter that is installed on a vehicle and sends a transmitter ID possessed by itself in response to reception of a radio wave; an on-board unit installed on the vehicle; a portable unit that radiates a radio wave to the ID transmitter and receives a transmitter ID generated by the ID transmitter; and an ID communication section that sends the transmitter ID from the portable unit to the on-board unit. The on-board unit determines the position of the portable unit based on the transmitter ID received from the portable unit.

A communication apparatus for a vehicle according to a third aspect of the present invention includes: at least one ID transmitter that is installed on a vehicle and sends a transmitter ID possessed by itself in response to reception of a radio wave; a portable unit that radiates a radio wave to the ID transmitter; and an on-board unit that is installed on the vehicle and receives the transmitter ID generated by the ID transmitter. The on-board unit determines the position of the portable unit based on the transmitter ID received from the ID transmitter.

According to the first aspect of the present invention, the portable unit receives a transmitter ID which is sent from the RF tag installed on the vehicle in response to reception of a radio wave from the on-board unit, and the transmitter ID thus received is communicated from the portable unit to the on-board unit, whereby the on-board unit can grasp the position of the portable unit with the transmitter ID thus received.

In addition, since at this time, the on-board unit, the RF tag and the portable unit are all mutually connected to one another through contactless communication by radio waves, wiring electrically connecting them to one another becomes unnecessary thereby to improve the degree of freedom of installation thereof, and a determination can be easily made as to whether the portable unit exists inside the vehicle.

Moreover, according to the second aspect of the present invention, the portable unit receives a transmitter ID which is sent from the RF tag installed on the vehicle in response to reception of a radio wave from the portable unit, and the transmitter ID thus received is communicated from the portable unit to the on-board unit, whereby the on-board unit can grasp the position of the portable unit with the transmitter ID thus received.

Further, according to the third aspect of the present invention, the on-board unit receives a transmitter ID which is sent from the RF tag installed on the vehicle in response to reception of the radio wave from the portable unit, whereby the on-board unit can grasp the position of the portable unit based on the transmitter ID thus received.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
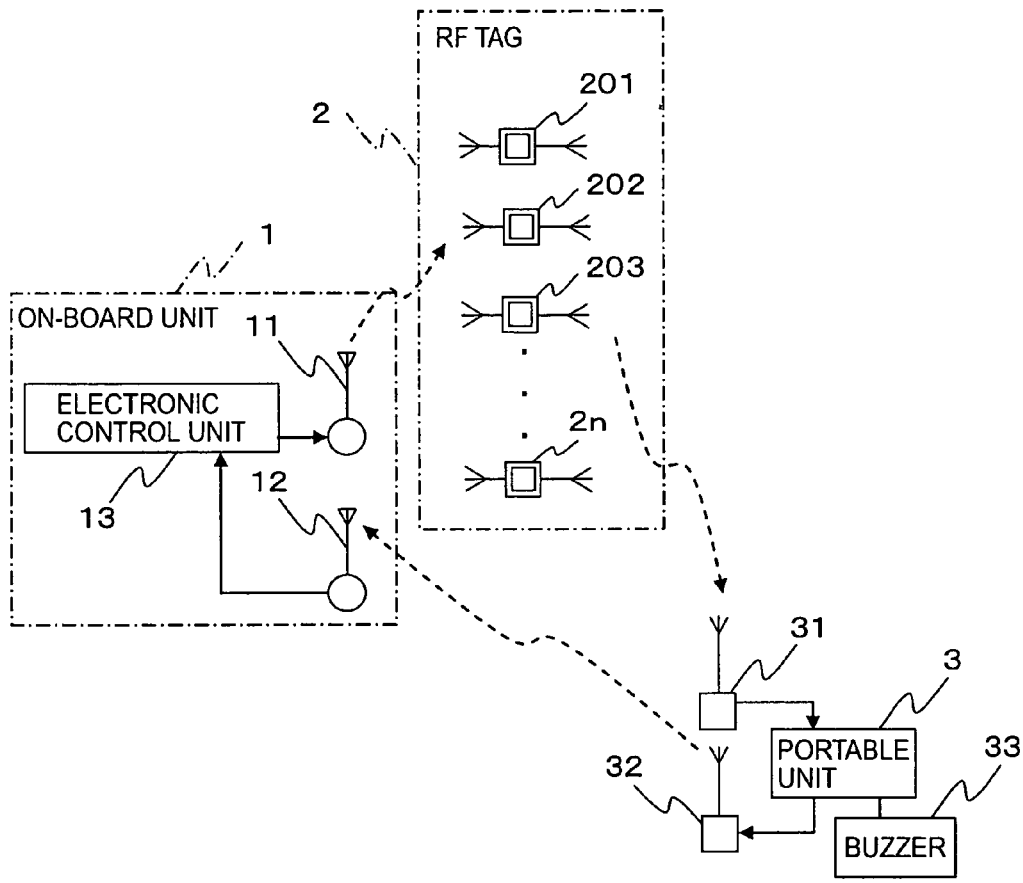
FIG. 1 is a block diagram showing the configuration of a communication apparatus for a vehicle according to a first embodiment of the present invention.

First of all, a first embodiment of the present invention will be described while using FIGS. 1 through 3 of the accompanying drawings. FIG. 1 is a block diagram that shows the configuration of a communication apparatus for a vehicle according to the first embodiment of the present invention.

In FIG. 1, the communication apparatus for a vehicle comprises an on-board unit 1, an RF tag 2 and a portable unit 3 which are communicable with one another, with the on-board unit 1 and the RF tag 2 being mounted on a vehicle. The on-board unit 1 installed inside the vehicle is provided with an antenna 11 that sends a radio wave for supplying electric power, an antenna 12 that receives a radio wave from the portable unit 3, and an electronic control unit 13 connected to the antennas 11, 12. The electronic control unit 13 controls the transmission of the radio wave from the antenna 11, and also controls respective parts of the vehicle based on a signal received by the antenna 12. Here, note that the antennas 11, 12 may be constituted by the same transmitting and receiving antenna.

The RF tag 2 functions as an ID transmitter, and sends a transmitter ID possessed by itself in response to reception of a radio wave from the on-board unit 1. Though herein is shown the case where the RF tag 2 comprises a plurality of RF tags (201, 202, 203, ... 2n), a single RF tag may also be used (i.e., the "RF tag 2" is a generic term for both of the single RF tag and the plurality of RF tags). Also, around 900 MHz or around 2.45 GHz are suitable for the operation frequency of the RF tag 2 (201, 202, 203, ... 2n), but a high frequency band can be used and the RF tag operation frequency is not necessarily limited to these frequencies.

In addition, though not illustrated, the RF tag 2 (201, 202, 203, ... 2n) includes an antenna and an antenna circuit that receive the radio wave from the on-board unit 1, a voltage extraction circuit that takes out a voltage from the received radio wave, various circuits that are operated by the extracted voltage, and a transmitting circuit that sends a transmitter ID as a radio wave. Further, the RF tag 2 may comprise an antenna that receives a radio wave from the on-board unit 1, and a surface acoustic wave generation circuit that generates a surface acoustic wave in response to reception of the radio wave from the on-board unit 1, wherein the RF tag 2 sends or transmits a transmitter ID possessed by itself by using the surface acoustic wave generated from the surface acoustic wave generation circuit. In this case, the RF tag 2 is replaced by the above-mentioned antenna and surface acoustic wave generation circuit, and the surface acoustic wave generation circuit is constructed in such a manner that it converts a radio wave received by the antenna into a surface acoustic wave thereby to generate a transmitter ID of a specific pattern, and also converts the surface acoustic wave into a radio wave again to send the transmitter ID (see, for instance, the above-mentioned non-patent document). In case where the RF tag 2 uses a surface acoustic wave, the output power of a radio wave radiated from the on-board unit 1 to the RF tag 2 can be suppressed to a low level.

The on-board unit 1 and the portable unit 3 are designed in accordance with the frequency of the RF tag 2 used.

The portable unit 3 is of a shape easy to be carried by a user, and is provided with an antenna 31 that receives a transmitter ID sent by the RF tag 2, an antenna 32 that sends data to the on-board unit 1, and a buzzer 33 that functions as a warning section.

Here, note that each of the antennas 31, 33 may be constructed in such a manner that it is able to send and receive a radio wave between the RF tag 2 and the on-board unit 1, or may be comprised of an integrated transmitting and receiving antenna.

The transmitting antenna 32 of the portable unit 3 constitutes an ID communication section in association with the receiving antenna 12 of the on-board unit 1, and the ID communication section sends a transmitter ID from the portable unit 3 to the on-board unit 1.

Next, reference will be made to the schematic operation of the communication apparatus for a vehicle according to the first embodiment of the present invention as shown in FIG. 1.

First of all, the on-board unit 1 installed on the vehicle radiates a radio wave to at least one RF tag 2 mounted in an appropriate place of the vehicle.

The RF tag 2 includes a power generation circuit that generates electric power in response to reception of the radio wave from the on-board unit 1, and sends a transmitter ID possessed by itself by using the electric power generated from the power generation circuit.

Here, note that the RF tag 2 may be constituted by the surface acoustic wave generation circuit in place of the power generation circuit, as stated above.

On the other hand, the portable unit 3 carried by the user receives the transmitter ID from the RF tag 2, and sends it to the on-board unit 1 through the ID communication section.

Finally, the on-board unit 1 determines the position of the portable unit 3 based on the transmitter ID received from the portable unit 3. In other words, it is determined whether the portable unit 3 exists inside or outside the vehicle.

Here, though the RF tag 2 functioning as an ID transmitter need only be a device that has a function to send an ID upon receipt of a radio wave from the outside, reference will be made herein to the case where the RF tag 2 is used, as shown in FIG. 1.

Next, reference will be made to how electric power and data is transferred through radio waves among the on-board unit 1, the RF tag 2 and the portable unit 3.

First of all, the on-board unit 1 supplies electric power to an RF tag 2n for instance by irradiating a radio wave from the transmitting antenna 11.

The RF tag 2n receiving the radio wave thus radiated has a voltage extraction section using a well-known prior art called a rectenna, and serves to rectify the received radio wave thereby to take out or extract a voltage, and to operate an internal circuit of the RF tag 2n by means of the extracted voltage, so that the transmitter ID held by the RF tag 2n is sent with a radio wave. At this time, the carrier wave used to send the transmitter ID can be supplied from the on-board unit 1 or generated by internal oscillation of the RF tag 2n.

Hereinafter, the portable unit 3 receives the transmitter ID sent from the RF tag 2n.

Here, reference will be made to a communicable area between the RF tag 2n and the portable unit 3.

Figure 2:
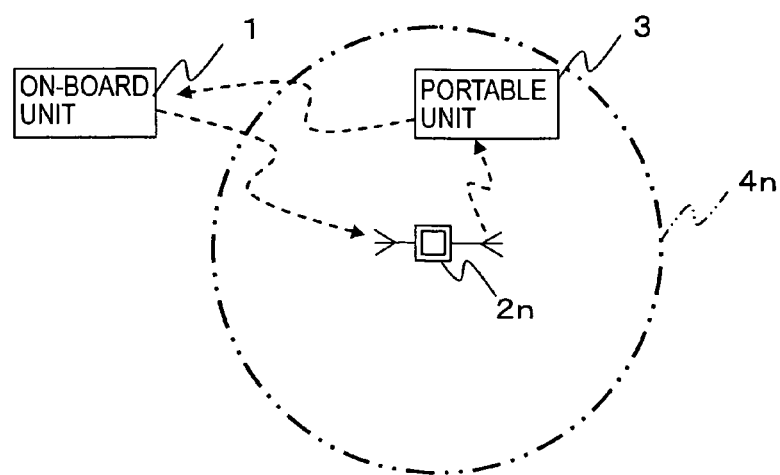
FIG. 2 is an explanatory view showing the relation between an on-board unit, an RF tag and a portable unit according to the first embodiment of the present invention.

FIG. 2 is an explanatory view that shows the coverage (communicable area 4n) of the transmitter ID from the RF tag 2n. In FIG. 2, a circle indicated by an alternate long and two short dashes line represents the coverage of the transmitter ID from the RF tag 2n, i.e., the communicable area 4n in which the portable unit 3 can receive the transmitter ID of the RF tag 2n.

The portable unit 3 can receive the transmitter ID when existing inside the communicable area 4n of the RF tag 2n, but can not receive it when existing outside the communicable area 4n.

The portable unit 3 existing in the communicable area 4n sends the received transmitter ID through a radio wave from the antenna 32 to the on-board unit 1.

The on-board unit 1 can recognize based on the transmitter ID sent from the portable unit 3 that the portable unit 3 exists in the communicable area 4n of the RF tag 2n.

Next, reference will be made to the state of arrangement and the operation of the RF tag 2 in case where the RF tag 2 is arranged in the interior of the vehicle and it is determined whether the portable unit 3 exists in the vehicle.

Figure 3:
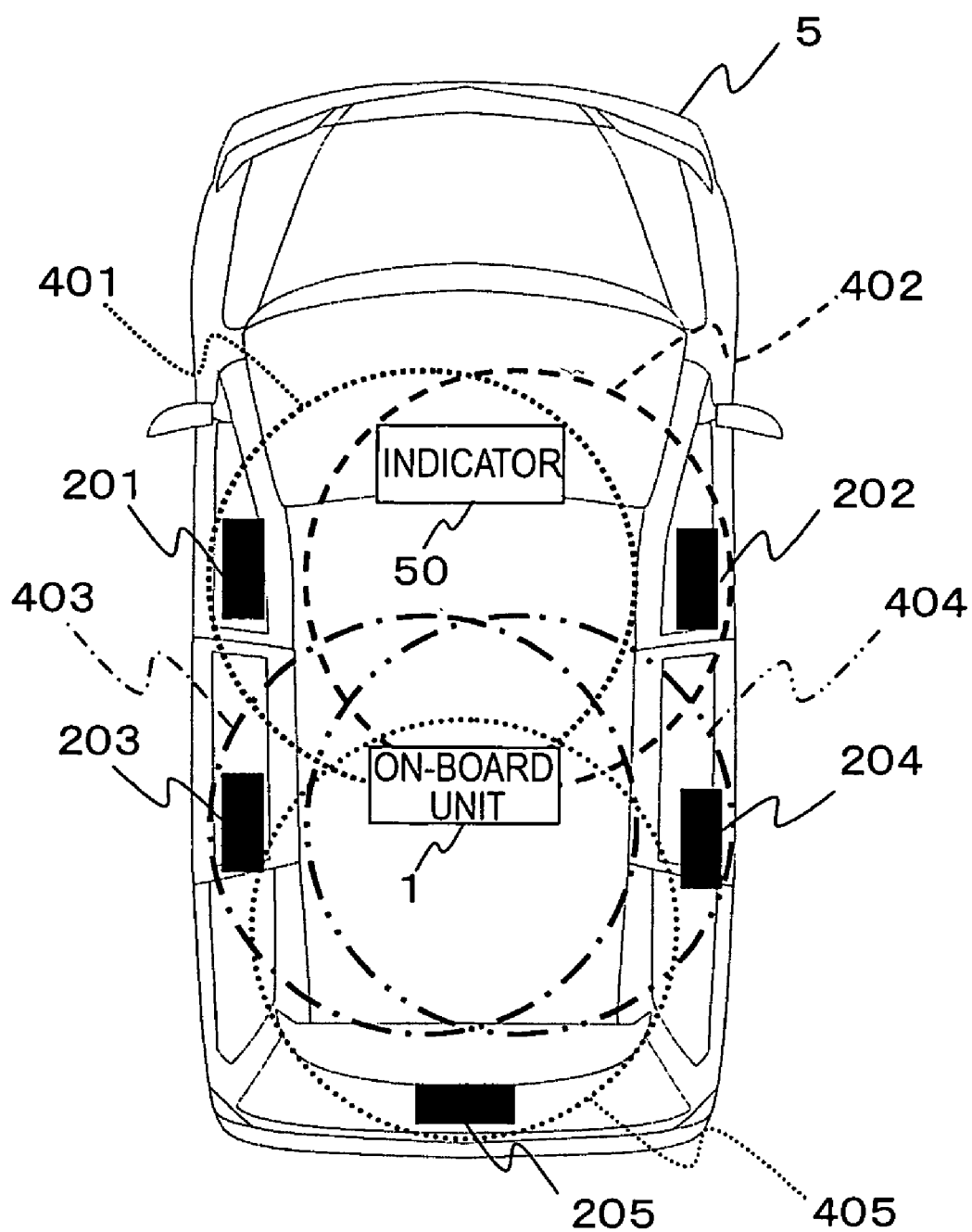
FIG. 3 is a plan view schematically showing an example of installation of RF tags according to the first embodiment of the present invention.

FIG. 3 is a plan view that shows the state of arrangement or installation of a plurality of RF tags 201 through 205 to a vehicle 5, wherein an image of the vehicle 5 as viewed from right above is schematically illustrated.

In FIG. 3, the on-board unit 1 is arranged or installed in the vehicle 5, and the RF tags 201 through 205 are installed in the interiors of the vehicle 5. In addition, an indicator 50 is installed on an indicator panel of the driver's seat.

The RF tags 201 through 205 have individual communicable areas 401 through 405 (individual coverages of transmitter IDs), respectively.

For instance, the RF tags 201 through 205 are installed on the interiors of door parts of the vehicle 5 at locations shown in FIG. 3.

As is clear from FIG. 3, it is found that the whole area in the vehicle 5 is covered when the communicable areas 401 through 405 of the respective RF tags 201 through 205 are overlapped with one another.

That is, a first condition for the arrangement of the RF tags 201 through 205 is that they are installed or arranged so as to cover the whole area in the vehicle 5, as shown in FIG. 3.

Also, a setting condition for the communicable areas 401 through 405 (coverages of the individual transmitter IDs) of the individual RF tags 201 through 205 is given that the communicable areas 401 through 405 do not exist outside the vehicle 5.

In other words, a second condition for the arrangement of the RF tags 201 through 205 is that the portable unit 3 existing outside the vehicle 5 (see FIGS. 1 and 2) can not receive the transmitter IDs of the RF tags 201 through 205.

In order to satisfy the first and second conditions for the arrangement of the RF tags 201 through 205, it is effective to install the RF tags 201 through 205 on the interiors lower than the window panes of the vehicle 5. However, as long as the first and second arrangement conditions are satisfied, neither the number nor the positions of the RF tags 201 through 205 may necessarily be identical with those which are shown in FIG. 3.

Here, note that the RF tags 201 through 205 may be attached to or stuck on the surfaces of the interiors of the vehicle 5, or may embedded in the interiors.

In case where the RF tags 201 through 205 are attached to the surfaces of the interiors, the positions of attachment can be freely selected, so the above arrangement conditions can be readily satisfied.

On the other hand, in case where the RF tags 201 through 205 are embedded in the interiors, there is an advantage that the aesthetic internal appearance of the vehicle 5 is not impaired and the RF tags 201 through 205 become resistant to damage due to external impact.

Further, the on-board unit 1 is arranged in such a manner that the distances of the on-board unit 1 from the respective RF tags 201 through 205 become as equal to one another as possible and all the RF tags 201 through 205 exist in the covering range of the radio wave radiated from the on-board unit 1, as shown in FIG. 3.

As a result, the radio wave radiated from the on-board unit 1 can reach all the RF tags 201 through 205 in a uniform manner, and it can also be supplied to the respective RF tags at the same time and hence is very efficient.

The RF tags 201 through 205 and the on-board unit 1 are arranged in the vehicle 5 so as to satisfy the above-mentioned requirements or conditions, whereby the portable unit 3 receives the transmitter IDs sent by the RF tags 201 through 205 in response to the radio wave radiated from the on-board unit 1, and communicates the received transmitter IDs from the portable unit 3 to the on-board unit 1.

As a result, when having received a transmitter ID from the portable unit 3, the on-board unit 1 can make a determination that the portable unit 3 exists in the vehicle 5.

Accordingly, in case where the user of the vehicle 5 is going away from the vehicle 5, it is determined, upon closure of a door of the vehicle 5 for example, whether the portable unit 3 exists in the vehicle 5, and the user can be informed of the determination result, for example, by driving the buzzer 33.

In addition, if the communicable areas 401 through 405 of the respective RF tags 201 through 205 are set so as to cover the whole area in the vehicle 5 with small overlapping areas formed between adjacent ones, the on-board unit 1 can specify the position in the vehicle in which the portable unit 3 exists by the received transmitter ID.

Thus, according to the first embodiment of the present invention, the portable unit 3 receives a transmitter ID which is sent from an RF tag 2 mounted on the vehicle in response to receipt of a radio wave from the on-board unit 1, and the transmitter ID thus received is communicated from the portable unit 3 to the on-board unit 1, whereby the on-board unit 1 can grasp the position of the portable unit 3 based on the transmitter ID received.

In addition, by separating the function of reading transmitter ID information into the portable unit 3 and the on-board unit 1 by the use of contactless communication due to radio waves of a high frequency band without depending on radio waves of an LF band that requires an expensive antenna, it is possible to achieve at low cost a communication apparatus for a vehicle which can make a determination as to whether the portable unit 3 exists inside or outside the vehicle 5.

In addition, since intercommunications between the on-board unit 1, the RF tag 2 and the portable unit 3 are all carried out through contactless communication by radio waves, wiring electrically connecting them to one another becomes unnecessary thereby to improve the degree of freedom of installation of the on-board unit 1 and the RF tag 2, and a determination can be easily made as to whether the portable unit 3 exists inside the vehicle.

Moreover, by displaying the position of the portable unit 3 onto the indicator 50 of the indicator panel in the vehicle 5 for instance based on the specified position of the portable unit 3, it becomes possible for the user to immediately find the portable unit 3 that has been left behind in the vehicle 5.

Although the ID communication section for sending a transmitter ID from the portable unit 3 to the on-board unit 1 has not been specifically referred to in the above description, it may be arranged in the portable unit 3 alone, or in both the on-board unit 1 and the portable unit 3.

For instance, a carrier wave may be generated by using a battery in the portable unit 3, and modulated by a transmitter ID for communication to the on-board unit 1, or a carrier wave may instead be radiated from the on-board unit 1 to the portable unit 3, which then modulates the received carrier wave and returns a transmitter ID to the on-board unit 1.

Furthermore, a radio wave may be radiated from the on-board unit 1 to the portable unit 3, which may then extract a voltage from the received radio wave, generate a carrier wave by using the thus extracted voltage as a power supply, modulate it by a transmitter ID, and communicate it to the on-board unit 1.

Embodiment 2

Although in the above-mentioned first embodiment, only the existence position of the portable unit 3 is determined and no mention has been made to the control of a specific on-board device (a door lock device, etc.) of the vehicle 5, the on-board device may be controlled in accordance with the result of a determination as to whether the portable unit 3 is appropriate.

Figure 4:
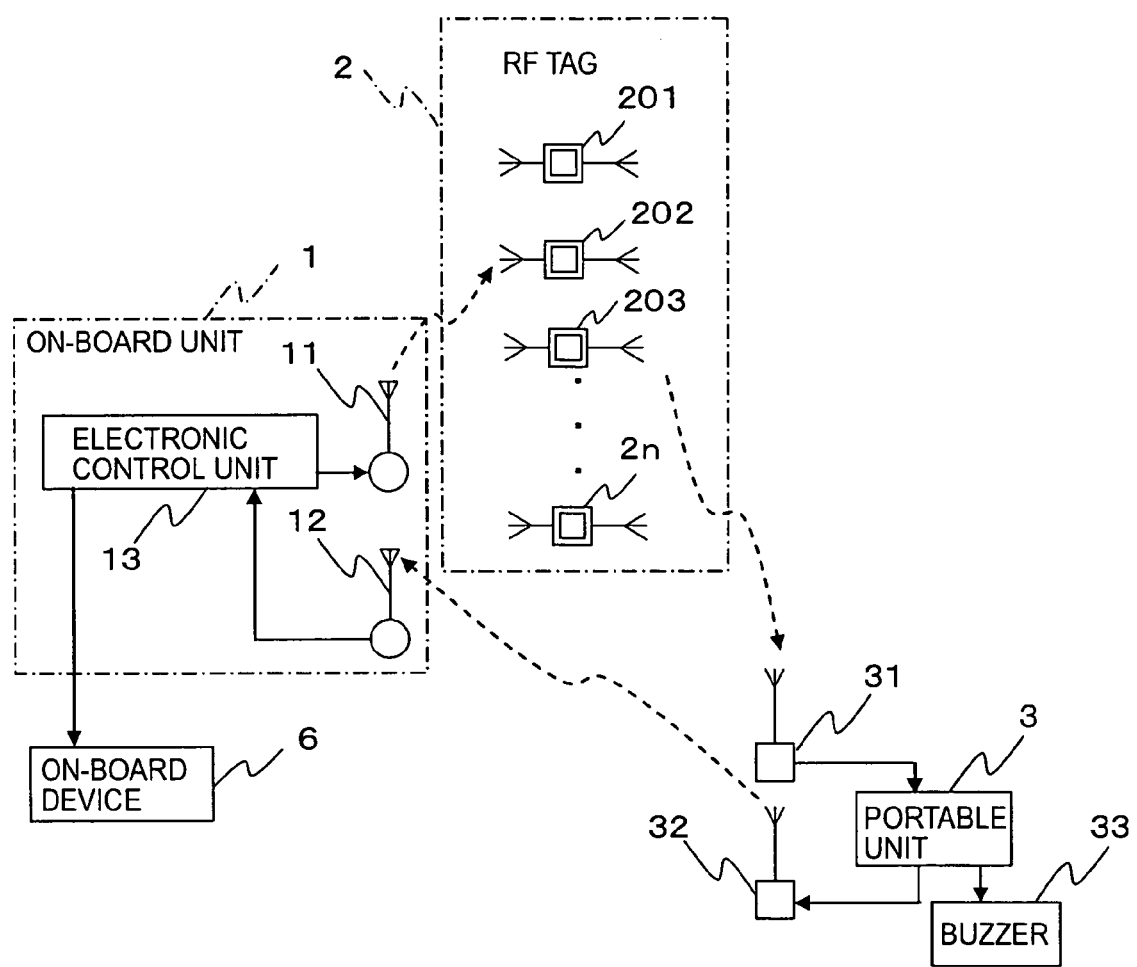
FIG. 4 is a block diagram showing the configuration of a communication apparatus for a vehicle according to a second embodiment of the present invention.

Hereinafter, reference will be made to a second embodiment of the present invention in which the on-board unit 1 is equipped with a function to control a device mounted on the vehicle 5 (hereinafter referred to as an on-board device). FIG. 4 is a block diagram that shows a communication apparatus for a vehicle according to this second embodiment of the present invention, in which the same or corresponding parts or elements as those as described above (see FIG. 1) are identified by the same symbols while omitting a detailed explanation thereof.

In FIG. 1, the electronic control unit 13 in the on-board unit 1 is connected to an on-board device 6 that controls doors or the like of the vehicle 5 (see FIG. 3).

The on-board device 6 is not limited to a door lock device controlled from the on-board unit 1, but may be any device that is arranged or installed in the vehicle 5 for controlling a part of the vehicle 5.

In this case, the portable unit 3 has an inherent portable unit ID, and for instance, an ID communication section in the portable unit 3 sends the portable unit ID from the portable unit 3 to the on-board unit 1.

As a result, the on-board unit 1 makes, based on the portable unit ID received from the portable unit 3, a determination as to whether the portable unit 3 is a proper or appropriate one, and controls the on-board device 6 in accordance with the determination result thereof.

The on-board device 6 controls the locking, unlocking, etc., of the doors of the vehicle 5 in accordance with an instruction from the electronic control unit 13 of the on-board unit 1.

For instance, when the user carrying the portable unit 3 approaches the vehicle 5, the on-board unit 1 verifies the existence of the portable unit 3 outside of the vehicle 5, and also verifies that the portable unit 3 is appropriate or proper, after which it unlocks the doors of the vehicle 5.

Hereinbelow, the operation of the on-board unit 1 illustrated in FIG. 4 will be explained while referring to a flow chart in FIG. 5 together with FIG. 3.

Here, reference will be made to the operation of the on-board unit 1 to control to unlock the doors of the vehicle 5 when the user carrying the portable unit 3 approaches the vehicle 5.

Figure 5:
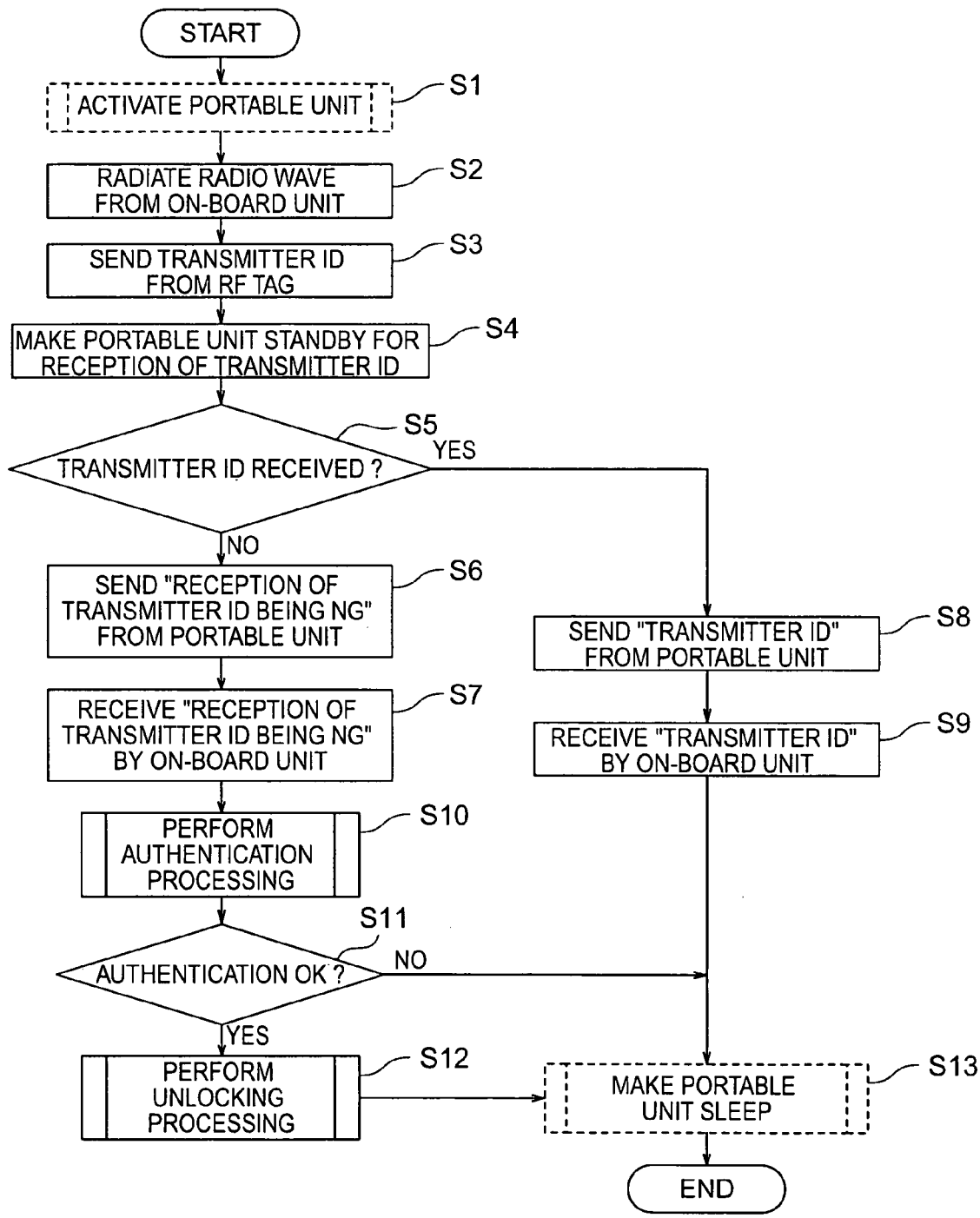
FIG. 5 is a flow chart showing door unlocking determination processing according to the second embodiment of the present invention.

In FIG. 5, first of all, when the user carrying the portable unit 3 approaches the vehicle 5, the portable unit 3 is activated (waked up) by a radio wave radiated from the on-board unit 1 in the vehicle 5, so that it is placed into a state in which it can receive transmitter IDs sent from RF tags 2 (201-2n) (step S1). At this time, though the portable unit 3 may be in a standby state capable of always receiving a transmitter ID 2, it is desirable from the viewpoint of reduction of power consumption that the portable unit 3 be usually in a sleep state (a dormant state of extremely low power consumption) and activated only in the vicinity of the vehicle 5. In addition, in step S1, though the portable unit 3 is activated in response to reception of an activation radio wave radiated from the on-board unit 1, radiation timing of the radio wave from the vehicle 5 may be set in such a manner that the on-board unit 1 always radiates the radio wave intermittently. Alternatively, it may be constructed from the viewpoint of reduction of power consumption such that an activation radio wave is radiated when a switch (not shown) installed on the outer side of a door of the vehicle 5 is pressed.

Subsequently, after a radio wave for power generation (hereinafter also referred to as a power generation radio wave) is radiated from the on-board unit 1 to supply electric power to the RF tag 2 (201-2n), a radio wave comprising a carrier wave is radiated from the on-board unit 1 to the RF tags 2 (201-2n)(step S2).

The RF tags 2 (201-2n) modulate the received carrier wave by means of their transmitter IDs by using the electric power supplied from the on-board unit 1, whereby the transmitter IDs are sent therefrom to the portable unit 3 (step S3).

On the other hand, the portable unit 3 is waiting for reception of a transmitter ID from an RF tag to be approached thereby among the RF tags 2 (201-2n) (step S4), and makes a determination as to whether it has received a transmitter ID from an RF tag at its nearby position to be approached by itself (step S5).

When it is determined in step S5 that the portable unit 3 does not receive a transmitter ID (that is, NO), the portable unit 3 sends data "the reception of a transmitter ID being NG" representing no reception of a transmitter ID to the on-board unit 1 (step S6).

The on-board unit 1 receives the data "the reception of a transmitter ID being NG" from the portable unit 3 (step S7), and assumes that the portable unit 3 still exists outside the vehicle, so it carries out authentication processing between the on-board unit 1 and the portable unit 3 (step S10). The processing in step S10 (determination as to whether the combination of the portable unit 3 and the on-board unit 1 is correct) is executed by an authentication processing section that is included in the electronic control unit 13 of the on-board unit 1.

Next, the authentication processing section determines whether the combination of the portable unit 3 and the on-board unit 1 is correct (authentication is OK) (step S11), and only when it is determined that both of them are a correct pair or set and hence the authentication is OK (that is, YES), the on-board device 6 is controlled to perform the door unlocking processing of the vehicle 5 (step S12).

Finally, after the door unlocking processing (step S12), sleep processing is carried out to shift the portable unit 3 to a dormant state (step S13), and the processing routine of FIG. 5 is terminated.

Alternatively, if the electric power of the portable unit 3 has extra margin or capacity, the portable unit 3 can be placed in a standby state capable of intermittently communicating with the on-board unit 1 without performing sleep processing (step S13).

On the other hand, when it is determined in step S11 (authentication processing) that the combination of the portable unit 3 and the on-board unit 1 is not collect (that is, NO), the control flow advances to sleep processing (step S13) at once, and the processing routine of FIG. 5 is terminated.

In addition, when it is determined in step S5 that the portable unit 3 receives a transmitter ID (that is, YES), the portable unit 3 sends the transmitter ID received from an RF tag to the on-board unit 1 (step S8). As a result, the on-board unit 1 receives the transmitter ID from the portable unit 3 (step S9), recognizes from the reception of the transmitter ID that the portable unit 3 exists in the vehicle, and can also recognize, from the received transmitter ID, the approximate position of the portable unit 3 in the vehicle.

Hereinafter, when it is determined from the reception of the transmitter ID from the portable unit 3 that the portable unit 3 exists in the vehicle, the electronic control unit 13 in the on-board unit 1 assumes that there is no need to unlock the doors of the vehicle 5, and shifts to the sleep processing of the portable unit 3 (step S13) without performing door unlocking processing (step S12), after which the processing routine of FIG. 5 is terminated.

The situation in which the on-board unit 1 receives the transmitter ID from the portable unit 3 occurs, for example, in case when an unauthorized person who does not carry the portable unit 3 tries to unlock a door from outside the vehicle after the user of the vehicle carrying the portable unit 3 has gotten into the vehicle and locked the doors. At this time, if the user in the vehicle accepts the person not carrying the portable unit 3 outside the vehicle and needs to unlock a door, the user in the vehicle can unlock the door by hand, whereas if the person outside the vehicle is a suspicious person, the user can leave the door in a locked state without unlocking the door. Thus, in order to prevent a suspicious person from unlocking a door from outside the vehicle without permission, it is necessary to determine whether the portable unit 3 exists in the vehicle.

Moreover, in case where there are a plurality of portable units 3, it is possible to identify the individual portable units 3 by assigning inherent portable unit IDs to the portable units 3, respectively. In this case, in the processing of transmitting the received data from the portable units 3 to the on-board unit 1 (steps S6 and S8), the portable units 3 send their portable unit IDs, which are inherent to themselves, to the on-board unit 1, whereby the on-board unit 1 can identify, based on the portable unit IDs thus received, those of the portable units 3 which exist inside the vehicle and those of the portable units 3 which exist outside the vehicle. In this case, when a user carrying a first portable unit 3 is going to unlock a door of the vehicle 5 from outside while another user carrying a second portable unit 3 has already gotten in the vehicle, the on-board unit 1 can permit the door of the vehicle 5 to be unlocked after having recognized that the first portable unit 3 exists outside the vehicle.

On the other hand, when a user with a portable unit 3 is going away from the vehicle 5, the electronic control unit 13 of the on-board unit 1 controls the on-board device 6 to automatically lock the doors of the vehicle 5 after having determined according to the above-mentioned determination processing (step S5) that there is no portable unit 3 in the vehicle.

The locking execution timing at this time is set to a time point at which a switch installed on the outer side of a door of the vehicle 5 is pressed, or a time point at which a signal from the portable unit 3 to the on-board unit 1 is interrupted or stopped.

In case where the locking execution timing is set based on the switching operation of the switch on the outer side of a door of the vehicle 5, when the switch outside the door is pressed, the door can be locked immediately after it is verified that the portable unit 3 does not exist in the vehicle 5.

Further, at this time, when the portable unit 3 exists in the vehicle 5, there is a possibility for the user to leave the portable unit 3 behind in the vehicle 5 despite going away therefrom, so the user can be assisted in finding the portable unit 3, for example, by sending a command from the on-board unit 1 to the portable unit 3 thereby to sound a buzzer 33 arranged in the portable unit 3. In this case, the portable unit 3 is constructed such that it is provided with the warning buzzer 33 and is also able to receive a command from the on-board unit 1.

In addition, even in case where there are a plurality of portable units 3 and the user who is going away from the vehicle 5 carries a certain portable unit 3 with another portable unit 3 being left in the vehicle 5, it is possible to identify the portable unit 3 left in the vehicle 5 based on its inherent portable unit ID so that only the buzzer of the portable unit 3 in the vehicle 5 can be sounded.

On the other hand, in case where the locking execution timing is set based on a time point at which communication from a portable unit 3 to the on-board unit 1 is stopped or broken off, for instance, when intermittent communication, being executed from a portable unit 3 to the on-board unit 1, is broken off after the engine of the vehicle 5 is stopped, the doors of the vehicle 5 can be locked.

In this case, by adjusting the transmission power of the portable unit 3 so as to set a communicable range from the portable unit 3 to the on-board unit 1 to be about 3 meters to 5 meters, the doors of the vehicle 5 can automatically be locked even when the user carrying the portable unit 3 is away from the vehicle 5 without pressing a lock switch, and hence it becomes further effective from the standpoint of crime prevention.

As described above, according to the second embodiment of the present invention, a portable unit 3 has an inherent portable unit ID, and sends the portable unit ID therefrom to the on-board unit 1 through an ID communication section therein, and the on-board unit 1 makes, based on the portable unit ID received from the portable unit 3, a determination as to whether the portable unit 3 is a proper or appropriate one, and controls the on-board device 6 in accordance with the determination result thereof. As a result, when the user approaches the vehicle 5, the on-board unit 1 automatically unlocks a door at the instant when it receives a proper portable unit ID.

In addition, the on-board unit 1 radiates a radio wave to a portable unit 3, and the portable unit 3 generates electric power in response to the reception of the radio wave from the on-board unit 1, so the power consumption of the portable unit 3 can be reduced.

Moreover, the on-board unit 1 radiates a radio wave to an RF tag 2 (ID transmitter), and the RF tag 2 includes a power generation circuit that generates electric power in response to reception of the radio wave from the on-board unit 1, and sends a transmitter ID possessed by itself by using the electric power generated from the power generation circuit. Accordingly, a battery built in the RF tag 2 can be reduced or eliminated.

Further, similarly as described above, the RF tag 2 may include a surface acoustic wave generation circuit that generates a surface acoustic wave in response to the reception of a radio wave from the on-board unit 1, and if the RF tag 2 sends the transmitter ID possessed by itself by using the surface acoustic wave generated from the surface acoustic wave generation circuit, it is possible to suppress the output of the radio wave radiated from the on-board unit 1 to the RF tag 2 to a low level.

Furthermore, as stated above, RF tags 2 (201-2n) are attached to or embedded in the surfaces of the interiors of the vehicle 5 so as to be arranged in appropriate positions, so that the communicable areas of the RF tags 2 can cover the entire indoor area of the vehicle 5, and the position of a portable unit 3 can be specified.

In addition, an indicator 50 for displaying the position of a portable unit 3 is installed on the indicator panel in the vehicle 5, and the on-board unit 1 specifies the position of the portable unit 3 based on the transmitter ID received from the portable unit 3, and displays it on the indicator 50. As a result, the user can easily verify or confirm the portable unit 3 left behind in the vehicle 5.

Moreover, if the portable unit 3 is provided with a receiving section (antenna 32) that receives a communication signal for warning from the on-board unit 1 and a warning section (buzzer 33) for generating a warning sound in response to the reception of the communication signal, the user can be given attention from the vehicle 5 when going away from the vehicle 5 with the portable unit 3 being left behind in the passenger compartment of the vehicle 5, whereby crime prevention can be improved.

Embodiment 3

Although in the above-mentioned second embodiment, the RF tags 2 are arranged in the vicinity of the vehicle doors, respectively, in consideration of the control of door locking devices of the vehicle 5, at least one of the RF tags 2 may be installed in the vicinity of the driver's seat of the vehicle 5 in consideration of engine starter control.

Figure 6:
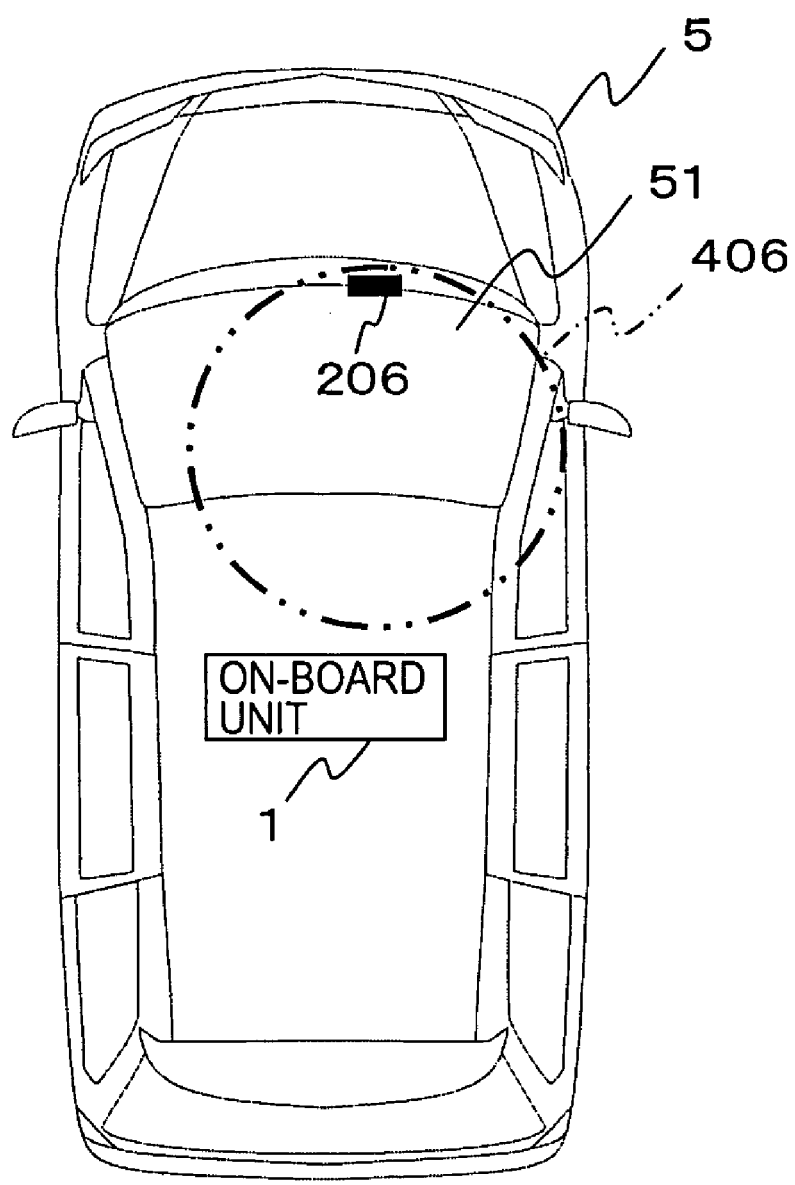
FIG. 6 is a plan view schematically showing an example of installation of an RF tag according to a third embodiment of the present invention.

Hereinafter, reference will be made to a third embodiment of the present invention in which an RF tag 2 is installed in the vicinity of a driver's seat. FIG. 6 is a plan view schematically showing an example of installation of an RF tag 206 according to the third embodiment of the present invention. Here, not that the overall construction of a communication apparatus for a vehicle according to the third embodiment of the present invention is as shown in FIG. 4, but the on-board device 6 has an engine starting function, and is applied at the time of engine starting operation of the vehicle 5.

In FIG. 6, the RF tag 206 is arranged in the vicinity of a driver's seat 51 of the vehicle 5 and has a communicable area 406 (coverage of an transmitter ID). Though only the single RF tag 206 is shown herein, it is assumed that a plurality of RF tags 2 are arranged in the passenger compartment of the vehicle 5, for example, as shown in FIG. 3.

Next, reference will be made to the operation of this third embodiment of the present invention while referring to FIG. 4 and FIG. 6.

First of all, when a user carrying a portable unit 3 take the driver's seat 51 of the vehicle 5 and performs engine starting operation, a radio wave is radiated from the on-board unit 1 to the RF tag 206, and the RF tag 206 having received the radio wave sends a transmitter ID held by itself. At this time, if the user is in the driver's seat 51 and the portable unit 3 exists within the area 406, the portable unit 3 receives the transmitter ID of the RF tag 206 and communicates the received transmitter ID to the on-board unit 1. Only when receiving the transmitter ID of the RF tag 206 from the portable unit 3, the on-board unit 1 controls the on-board device 6 (in this case, a starter device) so as to permit the starting of the engine. Thereafter, when the driver continues the engine starting operation, the engine is started.

Thus, by arranging at least one RF tag 206 among the plurality of RF tags 2 in the vicinity of the driver's seat 51 of the vehicle 5, the engine can be started only when an authorized user is in the driver's seat 51, i.e., when the existence area of the portable unit 3 is in the vicinity of the driver's seat 51. As a result, it is possible to prevent a person other than the authorized driver from falsely performing engine starting operation.

Embodiment 4

Although in the above-mentioned third embodiment (see FIG. 6), the RF tag 206 is arranged in the vicinity of the driver's seat 51 of the vehicle 5, RF tags 2 may be arranged on the window panes of the vehicle 5.

Figure 7:
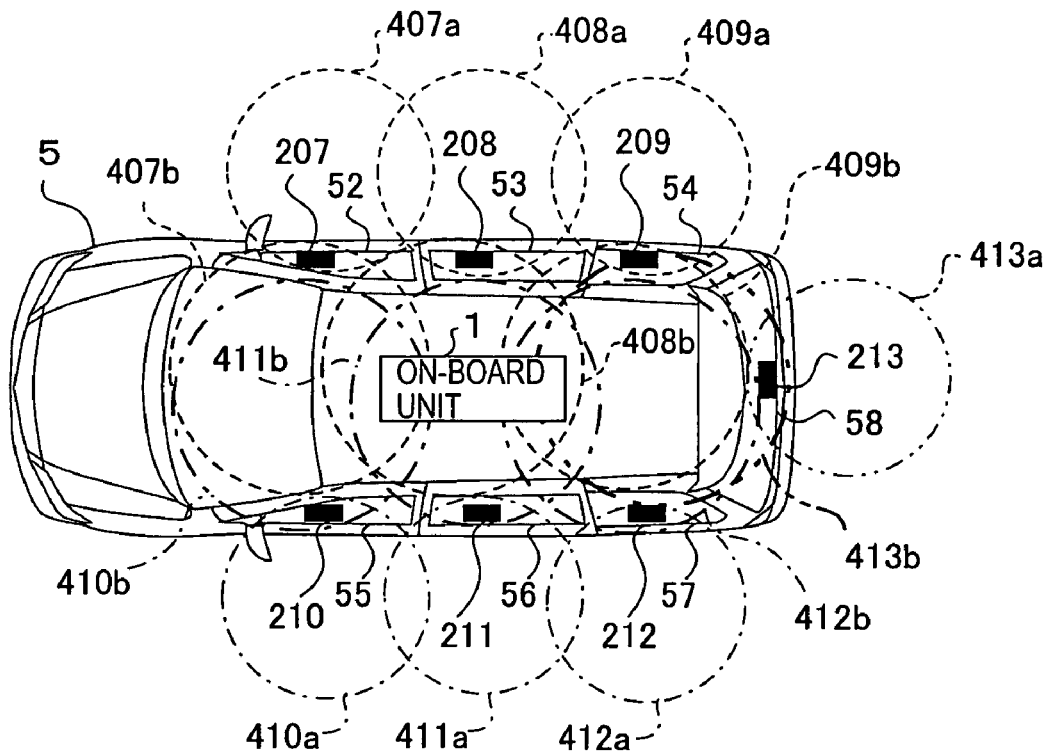
FIG. 7 is a plan view schematically showing an example of installation of RF tags according to a fourth embodiment of the present invention.
Figure 8:
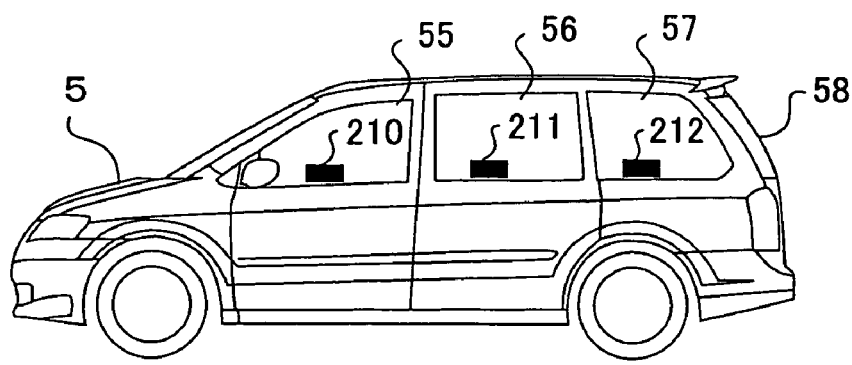
FIG. 8 is a side view schematically showing the example of installation of the RF tags according to the fourth embodiment of the present invention.

Hereinafter, reference will be made to a fourth embodiment of the present invention in which the RF tags 2 are installed on the window panes. FIG. 7 is a plan view that schematically shows an example of installation of RF tags 207 through 213 on the vehicle 5 according to the fourth embodiment of the present invention. FIG. 8 is a side elevation as viewed from the left side of the vehicle 5 of FIG. 7, showing the installation locations of the RF tags 210 through 212. Though only the RF tags 210, 211, 212 are shown on one side surface (e.g., left side surface) in FIG. 8, the RF tags 207, 208, 209, 213 are also installed at similar locations on the other side surface (e.g., right side surface) and the rear and portion of the vehicle 5.

In FIG. 7 and FIG. 8, the RF tags 207 through 213 are individually installed on window panes 52 through 58 of the vehicle 5. In addition, in FIG. 7, the on-board unit 1 is arranged at the center of the passenger compartment of the vehicle 5, similarly as stated above (see FIG. 3 and FIG. 6). The RF tags 207 through 213 have, as the coverages of their individual inherent transmitter IDs, outer communicable areas 407b through 413b outside the vehicle 5 and inner communicable areas 407b through 413b inside the vehicle 5, respectively. The RF tags 207 through 213 may be attached or adhered to the inner surfaces of the window panes 52 through 58, respectively, or may be embedded into the window panes 52 through 58, respectively.

In case where the RF tags 207 through 213 are installed on the window panes 52 through 58, respectively, as shown in FIG. 7 and FIG. 8, the transmitter IDs, which are sent from the RF tags 207 through 213 upon reception of the radio wave from the on-board unit 1, can reach not only inside but also outside the vehicle 5. Thus, even if the transmitter IDs are sent inside and outside the vehicle 5, it is possible to make a determination as to whether the portable unit 3 (see FIG. 4) exists inside or outside the vehicle 5.

Next, reference will be made to the processing of determining the existence position of the portable unit 3 according to the fourth embodiment of the present invention while referring to FIG. 7 and FIG. 8 together with FIG. 4. Here, description will be given while expediently focusing attention to the RF tags 207, 210 located forward of the vehicle 5 (driver's seat side).

The RF tag 207 has an outer communicable area 407a outside the vehicle 5 and an inner communicable area 407b inside the vehicle 5, and the RF tag 210 also has an outer communicable area 410a outside the vehicle 5 and an inner communicable area 410*b* inside the vehicle 5. At this time, the RF tags 207, 210 are arranged in such a manner that the inner communicable areas 407*b*, 410*b* of the RF tags 207, 210 form substantially the same area in the vehicle 5.

First of all, a radio wave is radiated from the on-board unit 1 thereby to generate the transmitter ID of the RF tag 207. At this time, if the portable unit 3 exists in the communicable areas 407*a*, 407*b* and can receive a radio wave from the RF tag 207, it returns the received transmitter ID of the RF tag 207 to the on-board unit 1.

Then, a radio wave is radiated from the on-board unit 1 to the RF tag 210, whereby the RF tag 210 is caused to generate its transmitter ID. At this time, if the portable unit 3 exists in the communicable areas 410*a*, 410*b* and can receive a radio wave from the RF tag 210, it returns the received transmitter ID of the RF tag 210 to the on-board unit 1.

When the transmitter IDs received from the portable unit 3 indicate both of the RF tags 207, 210, the position of the portable unit 3 in which both of the transmitter IDs can be received is only an overlapped portion of the inner communicable areas 407*b*, 410*b* inside the vehicle 5, so the on-board unit 1 determines that the portable unit 3 exists in the passenger compartment of the vehicle 5.

On the other hand, when the transmitter ID received from the portable unit 3 indicates only one of the RF tags 207, 210, the on-board unit 1 determines that the portable unit 3 exists in the outer communicable area 407*a* or 410*a*, i.e., in the vicinity of a door.

For instance, when only the transmitter ID of the RF tag 207 is received, the on-board unit 1 determines that the portable unit 3 exists in the communicable area 407*a*, whereas when only the transmitter ID of the RF tag 210 is received, the portable unit 3 determines that the portable unit 3 exists in the communicable area 410*a*.

Hereinafter, similarly as stated above, the electronic control unit 13 (see FIG. 4) in the on-board unit 1 can perform the rocking and unlocking of the doors in accordance with the determination result of whether the portable unit 3 exists in the passenger compartment of the vehicle 5.

In addition, when only the transmitter ID of one of the RF tags 207, 210 is received, the on-board unit 1 can determine whether the portable unit 3 exists in the vicinity of a left or right door. As a result, only the door on the side on which the portable unit 3 exists can be automatically unlocked. For instance, when only the transmitter ID of the RF tag 207 is received, the on-board unit 1 unlocks only the right side front door of the vehicle 5.

Although in the foregoing, description has been given by taking, as an example, the case where attention is focused on the RF tags 207, 210, similar determination processing is carried out for the other RF tags 2. For instance, in case where the RF tag 213 installed on the rear windshield 58 (e.g., a hatchback, etc.) at a rear end of the vehicle 5, the on-board unit 1 determines, when only the transmitter ID of the RF tag 213 is received, that a user carrying a portable unit 3 exists in the vicinity of a hatchback part outside the vehicle, and unlocks the hatchback.

According to the fourth embodiment of the present invention, the RF tags 207 through 213 are constructed such that they are arranged at the right and left windows of the vehicle 5, respectively, while being attached to or stuck on the inner surfaces of the window panes 52 through 58 (or embedded in the interiors of the window panes 52 through 58), respectively. As a result, it is possible to unlock only a minimum door as required in accordance with the user's approach position to the vehicle 5.

In addition, if an RF tag 2 is attached to or stuck on the inner surface of a window pane, the degree of freedom of the installation location thereof can be improved, or if an RF tag 2 is embedded in a window pane, the exterior or external appearance of the vehicle 5 can be improved.

Embodiment 5

Although in the above-mentioned fourth embodiment (see FIGS. 7 and 8), the RF tags 207 through 213 are arranged in the vicinity of the window panes 52 through 58 of the vehicle 5, respectively, at least one RF tag 2 may be arranged on the interior of a door of the vehicle 5.

Figure 9:
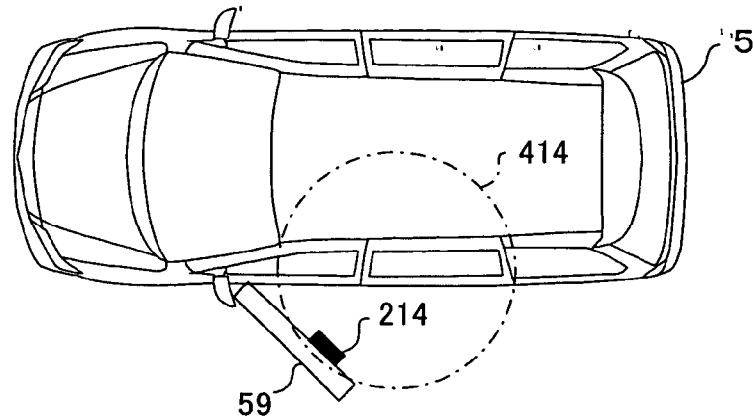
FIG. 9 is a plan view schematically showing an example of installation of an RF tag according to a fifth embodiment of the present invention.

Hereinafter, reference will be made to a fifth embodiment of the present invention in which an RF tag 2 is installed on the interior of a door of the vehicle 5. FIG. 9 is a plan view that schematically shows an example of installation of an RF tag 214 on the vehicle 5 according to the fifth embodiment of the present invention.

In FIG. 9, the RF tag 214 is installed on the interior of a door 59 of the vehicle 5, and has a communicable area 414. Though not illustrated herein, it is assumed that RF tags 2 are also arranged on the interiors of the other doors of the vehicle 5, respectively. In FIG. 9, the door 59 with the RF tag 214 installed thereon is shown in its open state.

For instance, if a user with a portable unit 3 (see FIG. 4) is in a passenger's seat or in the vicinity of the left side of the vehicle 5 with the portable unit 3 lying in the communicable area 414, the portable unit 3 will receive the transmitter ID of the RF tag 214, and send it to the on-board unit 1.

On the other hand, in case where the portable unit 3 is at the right side or at the rear end inside the vehicle 5 at the time when the door 59 is opened as shown in FIG. 9, the on-board unit 1 receives, from the portable unit 3, the transmitter ID of another RF tag 2 (not shown) arranged in the vehicle 5. Thereafter, when the user moves together with the portable unit 3 to enter the communicable area 414, the on-board unit 1 comes to receive the transmitter ID of the RF tag 214. Further, when the user with the portable unit 3 goes out of the vehicle 5 while passing through the communicable area 414, the on-board unit 1 becomes unable to receive a transmitter ID from the portable unit 3.

Accordingly, by keeping track of the received state of a transmitter ID, the on-board unit 1 is able to make a determination as to whether the portable unit 3 is carried out of the vehicle 5 passing through the door 59.

As described above, according to the fifth embodiment of the present invention, at least one of the plurality of RF tags 2 is installed on the interior of each door of the vehicle 5. As a result, at the instant when the user carrying the portable unit 3 gets out of the vehicle 5 and closes the door 59, the portable unit 3 is able to immediately recognize that the portable unit 3 has been taken out of the vehicle 5.

In addition, by informing or warning the user of the existence of the portable unit 3 outside the vehicle 5 at the timing when the portable unit 3 has been carried out of the vehicle 5, it is possible to prevent the user from carrying the portable unit 3 out of the vehicle 5 from the door 59 by mistake with the portable unit 3 put in a bag or the like for example. As a means for warning at this time, such information or warning may be displayed on an indicator 50 (see FIG. 3) of the vehicle 5, or a buzzer 33 (see FIG. 4) installed on the portable unit 3 may be sounded.

Embodiment 6

Although in the above-mentioned fourth embodiment (see FIGS. 7 and 8), the RF tag 2 is arranged at a lower portion of a window pane of the vehicle 5, it may be arranged in an upper portion of a window pane in consideration of the opening and closing of the window pane.

Figure 10:
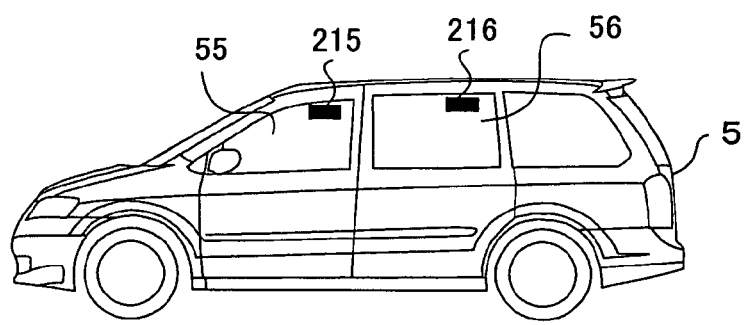
FIG. 10 is a side view schematically showing an example of installation of RF tags according to a sixth embodiment of the present invention.
Figure 11:
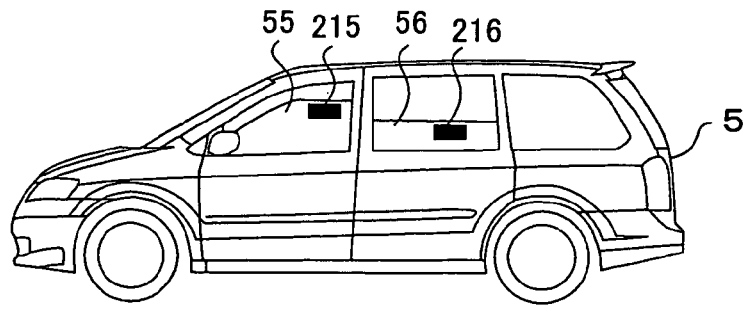
FIG. 11 is a side view schematically showing the example of installation of the RF tags with window panes being opened according to the sixth embodiment of the present invention.

Hereinafter, reference will be made to a sixth embodiment of the present invention in which RF tags 2 are arranged in upper portions of window panes, respectively. FIGS. 10 and 11 are side views that schematically show an example of installation of RF tags 215, 216 according to the sixth embodiment of the present invention, wherein FIG. 10 shows a state in which window panes 55, 56 are closed, and FIG. 11 shows a state in which the window panes 55, 56 are opened.

In FIGS. 10 and 11, the RF tags 215, 216 are installed in the upper portions of the movable window panes 55, 56 of the vehicle 5, respectively. Here, note that though the RF tags 215, 216 alone are illustrated herein, it is assumed that RF tags 2 are also arranged on the right side window panes of the vehicle 5 at similar locations. In addition, though not illustrated, it is also assumed that RF tags 2 used to determine whether the portable unit 3 (see FIG. 4) is in the vehicle are arranged in respective places inside the vehicle 5.

Now, reference will be made to the processing of determining the existence position of the portable unit 3 according to the sixth embodiment of the present invention while referring to FIG. 10 and FIG. 11 together with FIG. 4.

Description will be given, as one example, to the case where the window panes 55, 56 are opened, as shown in FIG. 11, with the portable unit 3 existing in the vehicle 5 so that the portable unit 3 is taken out of the vehicle through one of gaps formed at upper portions of the window panes 55, 56, respectively.

First of all, in a state where the portable unit 3 is in the vehicle, either of the transmitter IDs of RF tags (not shown) in the vehicle 5 is communicated from the portable unit 3 to the on-board unit 1. As a result, the on-board unit 1 is able to recognize that the portable unit 3 exists in the vehicle 5.

Thereafter, when the window panes 55, 56 are opened to some degree and the portable unit 3 is being taken out to the outside through an open space thus formed, the states of the window panes 55, 56 and the RF tags 215, 216 become as shown in FIG. 11. For instance, when considering the case where the portable unit 3 is taken to the outside from an open gap of the window pane 56, the portable unit 3 enters the communicable area of the transmitter ID of the RF tag 216 installed on the window pane 56 which is passed by the portable unit 3 itself, so the transmitter ID of the RF tag 216 is returned from the portable unit 3 to the on-board unit 1. Thereafter, when the portable unit 3 further moves to go out of the outer communicable area of the RF tag 216 of the portable unit 3, the portable unit 3 becomes unable to return the transmitter ID to the on-board unit 1.

Accordingly, by keeping track of the received state of the transmitter ID from the portable unit 3, the on-board unit 1 is able to make a determination as to whether the portable unit 3 is carried out of the vehicle 5 passing through the window 56.

As described above, according to the sixth embodiment of the present invention, at least one of the plurality of RF tags 2 is installed on the upper portion of the movable window pane 55 or 56 of the vehicle 5. Accordingly, the on-board unit 1 is able to make a determination as to whether the portable unit 3 is taken out from a gap or space above the upper portion of the opened movable window pane 55 or 56.

In addition, by informing or warning the user of the existence of the portable unit 3 outside the vehicle 5 at the timing when the portable unit 3 has been carried out of the vehicle 5, it is possible to prevent the user from carrying the portable unit 3 out of the vehicle 5 through the gap or space above the upper portion of the opened window pane 55 or 56 by mistake with the portable unit 3 put in a bag or the like for example.

Moreover, similarly as stated above, with the installation of the plurality of the RF tags 2, the on-board unit 1 can grasp the position of the portable unit 3 based on a received transmitter ID sent therefrom.

Further, intercommunication between the on-board unit 1, the RF tags 2 and the portable unit 3 is achieved by contactless communication due to radio waves. As a result, wiring between these elements becomes unnecessary, the degree of freedom of the installation positions thereof can be improved, thus making it possible to perform the determination of the position of the portable unit 3 in an easy manner.

Embodiment 7

Although in the above-mentioned first through sixth embodiments, an RF tag 2 is activated by a power supplying radio wave sent from the on-board unit 1 to generate a transmitter ID so that the portable unit 3 receives the transmitter ID from the RF tag 2 and sends it to the on-board unit 1, the portable unit 3 may activate an RF tag 2 and send a transmitter ID received from the RF tag 2 to the on-board unit 1.

Figure 12:
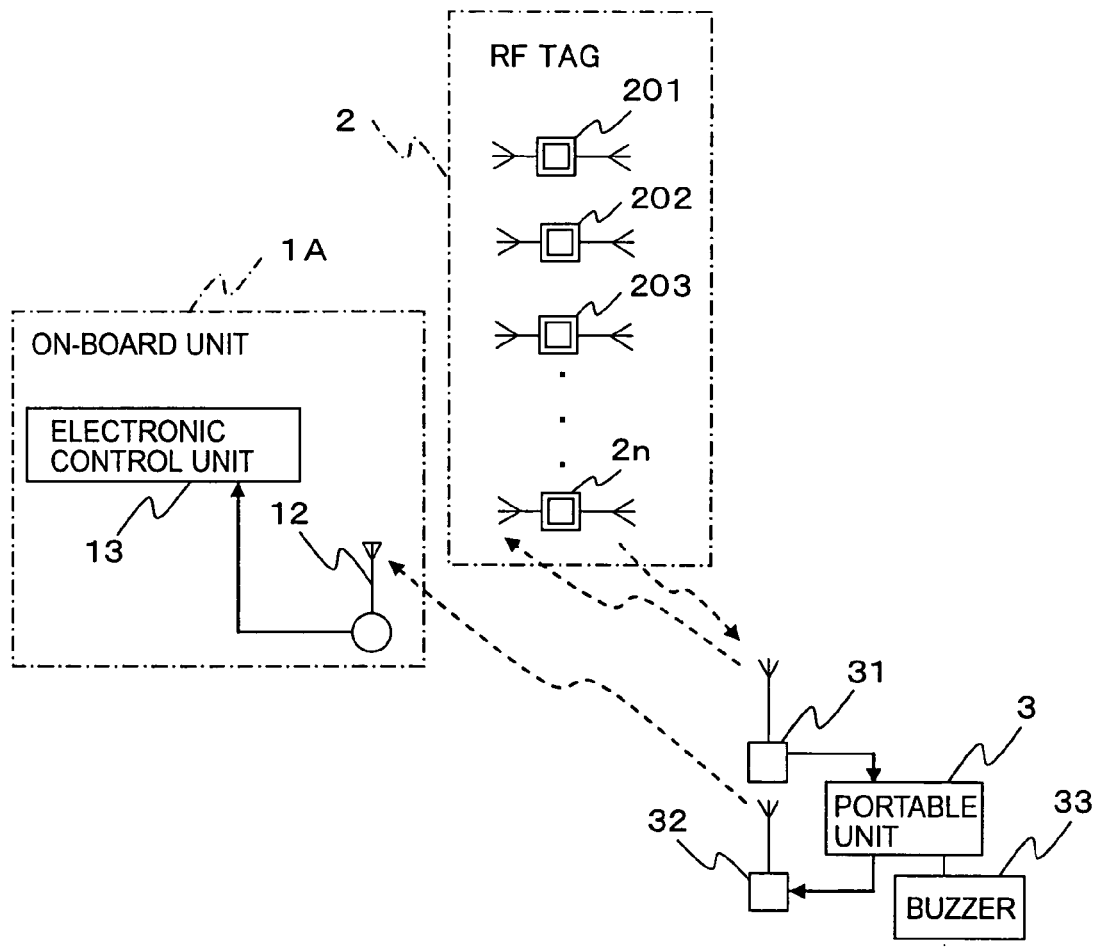
FIG. 12 is a block diagram showing the configuration of a communication apparatus for a vehicle according to a seventh embodiment of the present invention.

Hereinafter, reference will be made to a seventh embodiment of the present invention which is constructed such that the portable unit 3 can actuate an RF tag 2, while using FIGS. 12 and 13. FIG. 12 is a block diagram that shows the configuration of a communication apparatus for a vehicle according to the seventh embodiment of the present invention.

In FIG. 12, the communication apparatus for a vehicle comprises an on-board unit 1A, an RF tags 2 and a portable unit 3 which are communicable with one another, with the on-board unit 1A and the RF tag 2 being mounted on the vehicle. The on-board unit 1A installed inside the vehicle is provided with an antenna 12 for receiving a radio wave from the portable unit 3, and an electronic control unit 13 connected to the antenna 12. The electronic control unit 13 controls respective parts of the vehicle based on a signal received by the antenna 12. Here, note that the antenna 12 also functions as a transmitting and receiving antenna for bidirectional or two-way communication between the on-board unit 1A and the portable unit 3.

The RF tag 2 functions as an ID transmitter, and sends a transmitter ID possessed by itself in response to reception of a radio wave from the portable unit 3. As described before, herein is shown the case where the tag 2 comprises a plurality of RF tags (201, 202, 203, ... 2n), but a single RF tag may also be used (i.e., the "RF tag 2" is a generic term for both of the single RF tag and the plurality of RF tags). Also, though around 900 MHz or around 2.45 GHz are suitable for the operation frequency of the RF tag 2 (201, 202, 203, ... 2n), a high frequency band can be used and the RF tag operation frequency is not necessarily limited to these frequencies.

In addition, though not illustrated, the RF tag 2 (201, 202 203, ... 2n) includes an antenna and an antenna circuit that receive the radio wave from the portable unit 3, a voltage extraction circuit that takes out a voltage from the received radio wave, various circuits that are operated by the extracted voltage, and a transmitting circuit that sends a transmitter ID as a radio wave. Further, the RF tag 2 may comprise an antenna that receives a radio wave from the portable unit 3, and a surface acoustic wave generation circuit that generates a surface acoustic wave in response to reception of the radio wave from the portable unit 3, wherein the RF tag 2 sends or transmits a transmitter ID possessed by itself by using the surface acoustic wave generated from the surface acoustic wave generation circuit. In this case, the RF tag 2 is replaced by the above-mentioned antenna and surface acoustic wave generation circuit, and the surface acoustic wave generation circuit is constructed in such a manner that it converts a radio wave received by the antenna into a surface acoustic wave thereby to generate a transmitter ID of a specific pattern, and also converts the surface acoustic wave into a radio wave again to send the transmitter ID (see, for instance, the above-mentioned non-patent document). In case where the RF tag 2 uses a surface acoustic wave, the output power of a radio wave radiated from the portable unit 3 to the RF tag 2 can be suppressed to a low level.

The portable unit 3 are designed in accordance with the frequency of the RF tag 2 used. The portable unit 3 is of a shape easy to be carried by a user, and is provided with an antenna 31 for communication with the RF tag 2, an antenna 32 that sends data to the on-board unit 1, and a buzzer 33 that functions as a warning section. Here, note that the antenna 32 also functions as a transmitting and receiving antenna for bidirectional or two-way communication between the portable unit 3 and the on-board unit 1A, and the antennas 31, 32 may be constituted by the same transmitting and receiving antenna.

The antenna 31 of the portable unit 3 radiates a power supplying radio wave to the RF tag 2, and receives a transmitter ID sent by the RF tag 2. The transmitting antenna 32 and a communication circuit (to be described later) in the portable unit 3 together constitute an ID communication section in association with the receiving antenna 12 of the on-board unit 1A, and the ID communication section sends a transmitter ID from the portable unit 3 to the on-board unit 1A.

Here, note that the RF tag 2 may be constituted by the surface acoustic wave generation circuit in place of the power generation circuit, as stated above.

Next, reference will be made to the schematic operation of the communication apparatus for a vehicle according to the seventh embodiment of the present invention as shown in FIG. 12.

First of all, the portable unit 3 carried by the user supplies electric power to the RF tag 2 (201 through 2n) by radiating a power supplying radio wave from the antenna 31 to the RF tag 2, e.g., by sending a radio wave to the RF tag 2. An RF tag 2n having received the radiation of the radio wave generates electric power in response to the reception of the radio wave, and transmits or sends a transmitter ID possessed by itself by using the electric power thus generated.

On the other hand, the portable unit 3 receives the transmitter ID from the RF tag 2, and sends it to the on-board unit 1A through the ID communication section.

Finally, the on-board unit 1A determines the position of the portable unit 3 based on the transmitter ID received from the portable unit 3. In other words, it is determined whether the portable unit 3 exists inside or outside the vehicle.

Though the RF tag 2 functioning as an ID transmitter need only be a device that has a function to send an ID upon receipt of a radio wave from the outside, reference will be made herein to the case where the RF tag 2 is used, as shown in FIG. 1.

Now, reference will be made to how electric power and data is transferred through radio waves among the on-board unit 1A, the RF tag 2 and the portable unit 3.

First of all, the portable unit 3 supplies electric power to an RF tag 2n for instance by irradiating a radio wave from the transmitting antenna 31.

The RF tag 2n receiving the radio wave radiated from the antenna 31 of the portable unit 3 has a voltage extraction section using a well-known prior art called a rectenna, and serves to rectify the received radio wave thereby to take out or extract a voltage, and to operate an internal circuit of the RF tag 2n by means of the extracted voltage, so that the transmitter ID held by the RF tag 2n is sent with a radio wave. At this time, a carrier wave used to send the transmitter ID can be supplied from the portable unit 3 or generated by internal oscillation of the RF tag 2n.

Hereinafter, the portable unit 3 receives the transmitter ID sent from the RF tag 2n. Here, reference will be made to a communicable area between the RF tag 2n and the portable unit 3.

Figure 13:
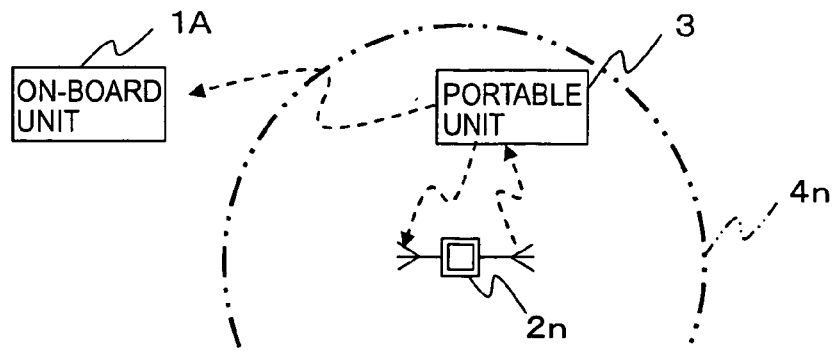
FIG. 13 is an explanatory view showing the relation between an on-board unit, an RF tag and a portable unit according to the seventh embodiment of the present invention.

FIG. 13 is an explanatory view that shows the coverage (communicable area 4n) of the transmitter ID from the RF tag 2n. In FIG. 13, a circle indicated by an alternate long and two short dashes line represents the coverage of the transmitter ID from the RF tag 2n, i.e., the communicable area 4n in which the portable unit 3 can receive the transmitter ID of the RF tag 2n.

The portable unit 3 can receive the transmitter ID when existing inside the communicable area 4n of the RF tag 2n, but can not receive it when existing outside the communicable area 4n. The portable unit 3 existing in the communicable area 4n sends the received transmitter ID through a radio wave from the antenna 32 to the on-board unit 1A. The on-board unit 1A can recognize based on the transmitter ID sent from the portable unit 3 that the portable unit 3 exists in the communicable area 4n of the RF tag 2n.

Next, reference will be made to the state of arrangement and the operation of the RF tag 2 in case where the RF tag 2 is arranged in the interior of the vehicle and it is determined whether the portable unit 3 exists in the vehicle. Here, note that the state of installation of the RF tags 201 through 205 to the vehicle 5 is as shown in the above-mentioned FIG. 3 (plan view), and the condition of installation, etc., of the RF tags 201 through 205 is also similar to that described above, but the on-board unit 1A can be installed in an arbitrary position in the vehicle 5 as long as communication can be made between the on-board unit 1A and the portable unit 3.

The RF tags 201 through 205 and the on-board unit 1A are arranged in the vehicle 5 so as to satisfy the above-mentioned requirements or conditions, whereby the portable unit 3 receives the transmitter IDs sent by the RF tags 201 through 205 in response to the radio wave radiated from the portable unit 3 itself, and communicates the received transmitter IDs from the portable unit 3 to the on-board unit 1. As a result, when having received a transmitter ID from the portable unit 3, the on-board unit 1A can make a determination that the portable unit 3 exists in the vehicle 5.

Accordingly, similarly as stated above, in case where the user of the vehicle 5 is going away from the vehicle 5, it is determined, upon closure of a door of the vehicle 5 for example, whether the portable unit 3 exists in the vehicle 5, and the user can be informed of the determination result, for example, by driving the buzzer 33.

In addition, if the communicable areas 401 through 405 of the respective RF tags 201 through 205 are set so as to cover the whole area in the vehicle 5 with small overlapping areas formed between adjacent ones, the on-board unit 1A would can specify the position in the vehicle in which the portable unit 3 exists by a received transmitter ID.

As described above, according to the seventh embodiment of the present invention, the portable unit 3 receives a transmitter ID which is sent from an RF tag 2 installed on the vehicle 5 in response to reception of a radio wave from the portable unit 3, and the transmitter ID thus received is communicated from the portable unit 3 to the on-board unit 1A, whereby the on-board unit 1A can grasp the position of the portable unit 3 based on the transmitter ID received.

Also, by providing the function of reading the RF tag 2 to the portable unit 3 by the use of contactless communication due to radio waves of a high frequency band without depending on radio waves of an LF band that requires an expensive antenna, it is possible to achieve at low cost a communication apparatus for a vehicle which can make a determination as to whether the portable unit 3 exists inside or outside the vehicle 5.

In addition, since intercommunications between the on-board unit 1A, the RF tag 2 and the portable unit 3 are all carried out through contactless communication by radio waves, wiring electrically connecting them to one another becomes unnecessary thereby to improve the degree of freedom of installation of the on-board unit 1A and the RF tag 2, and a determination can be easily made as to whether the portable unit 3 exists inside the vehicle.

Moreover, by displaying the position of the portable unit 3 onto the indicator 50 of the indicator panel in the vehicle 5 for instance based on the specified position of the portable unit 3, it becomes possible for the user to immediately find the portable unit 3 that has been left behind in the vehicle 5.

In the above description, the ID communication section for sending a transmitter ID from the portable unit 3 to the on-board unit 1A has not been specifically referred to, but for instance, a carrier wave may be generated by using a battery in the portable unit 3, and modulated by a transmitter ID for communication to the on-board unit 1A, or a carrier wave may instead be radiated from the on-board unit 1A to the portable unit 3, which then modulates the received carrier wave and returns a transmitter ID to the on-board unit 1A.

Furthermore, a radio wave may be radiated from the on-board unit 1A to the portable unit 3, which may then extract a voltage from the received radio wave, generate a carrier wave by using the thus extracted voltage as a power supply, modulate it by a transmitter ID, and communicate it to the on-board unit 1A.

Embodiment 8

Although in the above-mentioned seventh embodiment, only the existence position of the portable unit 3 is determined and no mention has been made to the specific control of the on-board device (door lock device, etc.) of the vehicle 5, the on-board device may be controlled in accordance with the result of a determination as to whether the portable unit 3 is appropriate.

Figure 14:
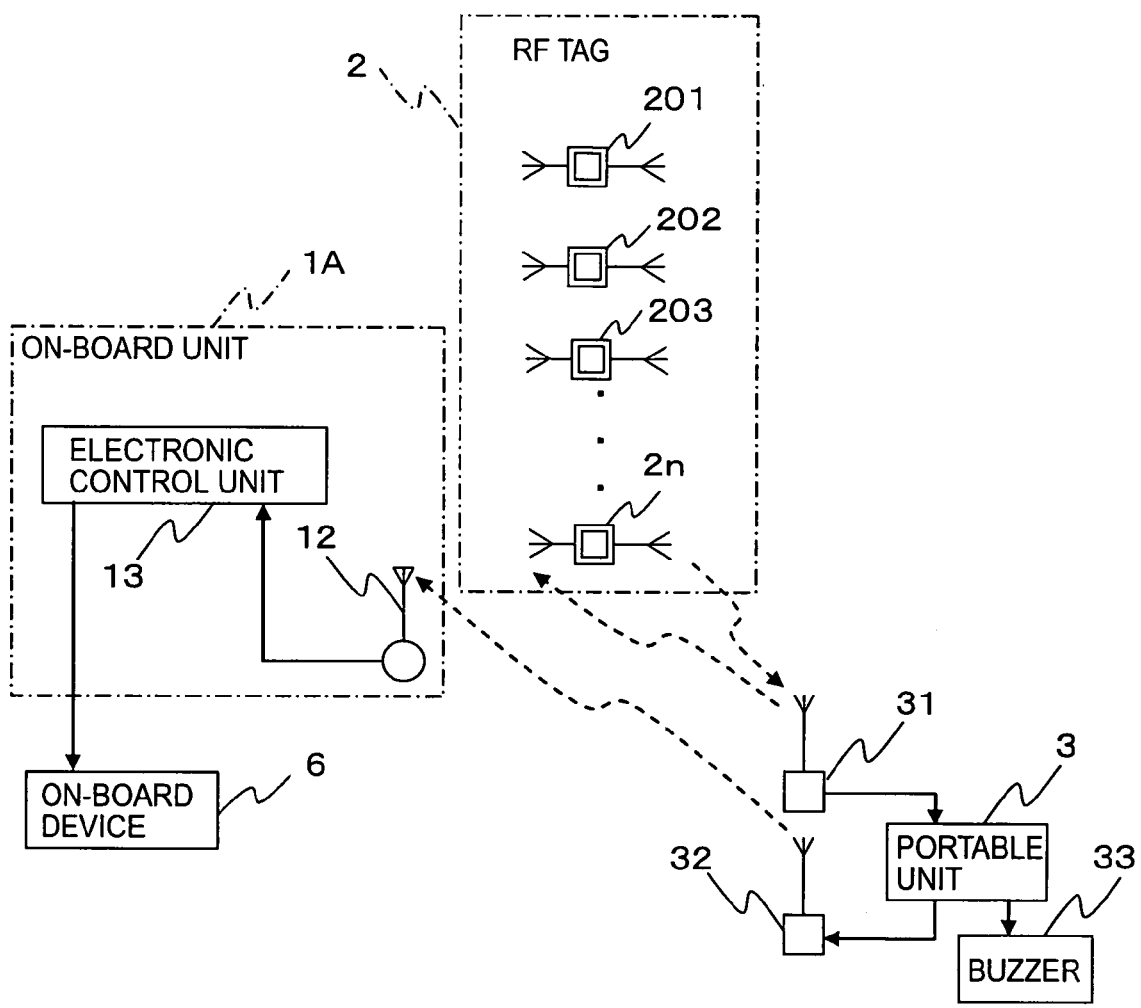
FIG. 14 is a block diagram showing the configuration of a communication apparatus for a vehicle according to an eighth embodiment of the present invention.

Hereinafter, reference will be made to an eighth embodiment of the present invention in which an on-board unit 1A is equipped with a function to control an on-board device. FIG. 14 is a block diagram that shows a communication apparatus for a vehicle according to this eighth embodiment of the present invention, in which the same or corresponding parts or elements as those as described above (see FIG. 12) are identified by the same symbols while omitting a detailed explanation thereof.

In FIG. 14, an electronic control unit 13 in the on-board unit 1A is connected to an on-board device 6 for controlling doors or the like of the vehicle 5 (see FIG. 3). The on-board device 6 is not limited to a door lock device controlled from the oh-board unit 1A, but may be, any device that is arranged or installed in the vehicle 5 for controlling a part of the vehicle 5.

In this case, the portable unit 3 has an inherent portable unit ID, and for instance, an ID communication section in the portable unit 3 sends the portable unit ID from the portable unit 3 to the on-board unit 1A. As a result, the on-board unit 1A makes, based on the portable unit ID received from the portable unit 3, a determination as to whether the portable unit 3 is a proper or appropriate one, and controls the on-board device 6 in accordance with the determination result thereof.

The on-board device 6 controls the locking, unlocking, etc., of the doors of the vehicle 5 in accordance with an instruction from the electronic control unit 13 of the on-board unit 1A. For instance, when the user carrying the portable unit 3 approaches the vehicle 5, the on-board unit 1A verifies the existence of the portable unit 3 outside of the vehicle 5, and also verifies that the portable unit 3 is appropriate or proper, after which it unlocks the doors of the vehicle 5.

Next, reference will be made to the operation of the on-board unit 1A illustrated in FIG. 14 while referring to a flow chart in FIG. 15 together with FIG. 3.

Figure 15:
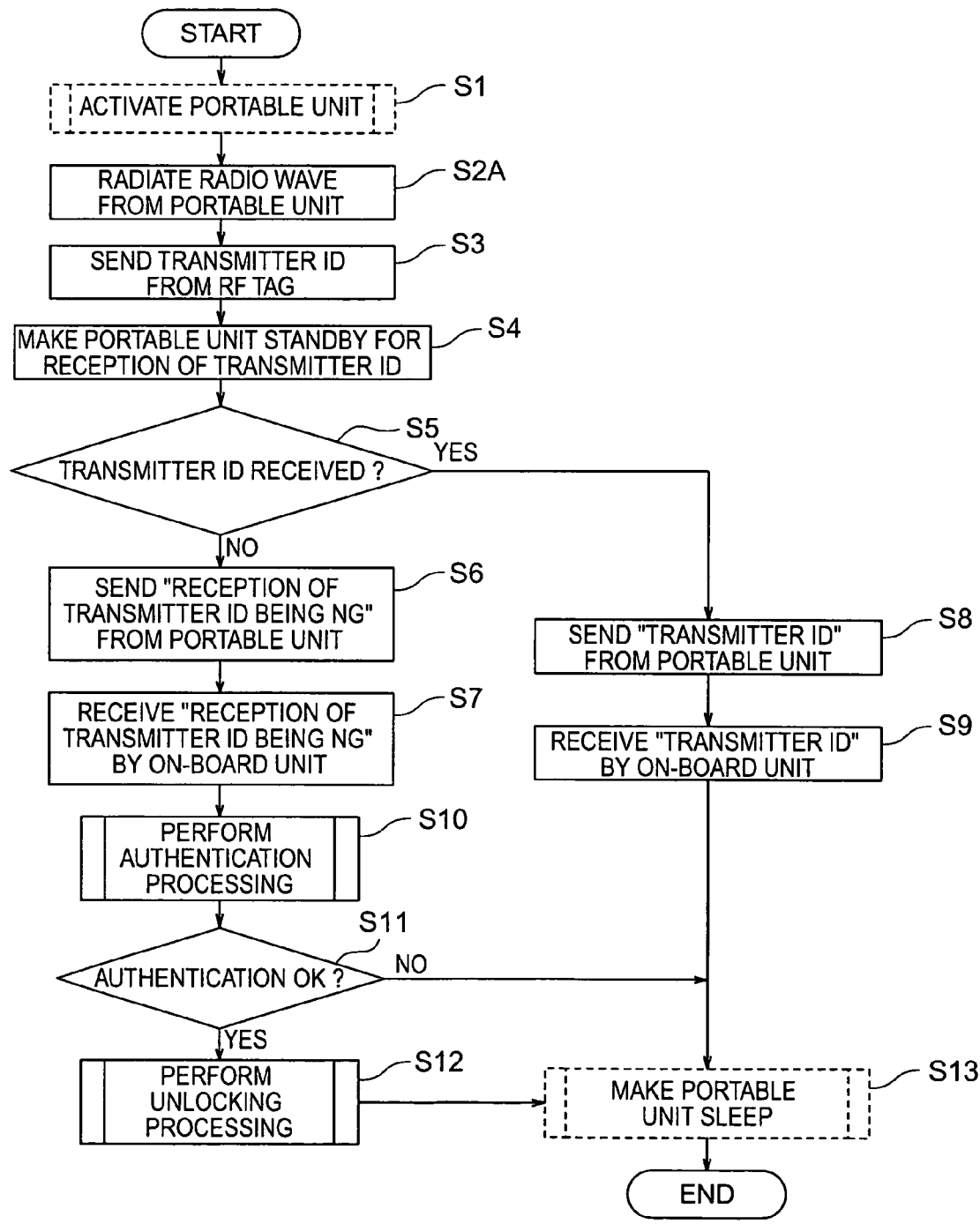
FIG. 15 is a flow chart showing door unlocking determination processing according to the eighth embodiment of the present invention.

FIG. 15 is a flow chart that shows door unlocking determination processing according to the eighth embodiment of the present invention, and the same symbols are attached to the same processes as referred to above (see FIG. 5), with only step S2A being different from the above-mentioned. In this case, too, reference will be made to an operation in which when a user carrying the portable unit 3 approaches the vehicle 5, the on-board unit 1A verifies that the portable unit 3 exists outside the vehicle 5, and then controls to unlock the doors of the vehicle 5, as stated above.

In FIG. 15, first of all, when the user carrying the portable unit 3 approaches the vehicle 5, the portable unit 3 is activated (waked up) by a radio wave radiated from the on-board unit 1A in the vehicle 5, so that it is placed into a state in which it can receive transmitter IDs sent from RF tags 2 (201-2n) (step S1). At this time, though the portable unit 3 may always be in a standby state capable of supplying electric power to the RF tags 2, it is desirable from the viewpoint of reduction of power consumption that the portable unit 3 be usually in a sleep state (a dormant state of extremely low power consumption) and activated only in the vicinity of the vehicle 5. In addition, in step S1, though the portable unit 3 is activated in response to reception of an activation radio wave radiated from the on-board unit 1A, radiation timing of the radio wave from the vehicle 5 may be set in such a manner that the on-board unit 1A always radiates the radio wave intermittently. Alternatively, it may be constructed from the viewpoint of reduction of power consumption such that an activation radio wave is radiated when a switch (not shown) installed on the outer side of a door of the vehicle 5 is pressed.

Subsequently, after a radio wave for power generation is radiated from the portable unit 3 to supply electric power to the RF tags 2 (201-2n), a radio wave comprising a carrier wave is radiated from the portable unit 3 to the RF tags 2 (201-2n) (step S2A).

The RF tags 2 (201-2n) modulate the received carrier wave by means of their transmitter IDs by using the electric power supplied from the portable unit 3, whereby the transmitter IDs are sent therefrom to the portable unit 3 (step S3).

On the other hand, the portable unit 3 is waiting for reception of a transmitter ID from an RF tag to be approached thereby among the RF tags 2 (201-2n) (step S4), and makes a determination as to whether it has received a transmitter ID from an RF tag at its nearby position to be approached by itself (step S5).

When it is determined in step S5 that the portable unit 3 does not receive a transmitter ID (that is, NO), the portable unit 3 sends data "the reception of a transmitter ID being NG" representing no reception of a transmitter ID to the on-board unit 1A (step 6).

The on-board unit 1A receives the data "the reception of a transmitter ID being NG" from the portable unit 3 (step S7), and assumes that the portable unit 3 still exists outside the vehicle, so it carries out authentication processing between the on-board unit 1A and the portable unit 3 (step S10). The processing in step S10 (determination as to whether the combination of the portable unit 3 and the on-board unit 1A is correct) is executed by an authentication processing section that is included in the electronic control unit 13 of the on-board unit 1A.

Next, the authentication processing section determines whether the combination of the portable unit 3 and the on-board unit 1A is correct (authentication is OK) (step S11), and only when it is determined that both of them are a correct pair or set and hence the authentication is OK (that is, YES), the on-board device 6 is controlled to perform the door unlocking processing of the vehicle 5 (step S12).

Finally, after the door unlocking processing (step S12), sleep processing is carried out to shift the portable unit 3 to a dormant state (step S13), and the processing routine of FIG. 15 is terminated. Alternatively, if the electric power of the portable unit 3 has extra margin or capacity, the portable unit 3 can be placed in a standby state capable of intermittently communicating with the on-board unit 1A without performing sleep processing (step S13).

On the other hand, when it is determined in step S11 (authentication processing) that the combination of the portable unit 3 and the on-board unit 1A is not collect (that is, NO), the control flow advances to sleep processing (step S13) at once, and the processing routine of FIG. 15 is terminated.

In addition, when it is determined in step S5 that the portable unit 3 receives a transmitter ID (that is, YES), the portable unit 3 sends the transmitter ID received from an RF tag to the on-board unit 1A (step S8). As a result, the on-board unit 1A receives the transmitter ID from the, portable unit 3 (step S9), recognizes from the reception of the transmitter ID that the portable unit 3 exists in the vehicle, and can also recognize, from the received transmitter ID, the approximate position of the portable unit 3 in the vehicle.

Hereinafter, when it is determined from the reception of the transmitter ID from the portable unit 3 that the portable unit 3 exists in the vehicle, the electronic control unit 13 in the on-board unit 1A assumes that there is no need to unlock the doors of the vehicle 5, and shifts to the sleep processing of the portable unit 3 (step S13) without performing door unlocking processing (step S12), after which the processing routine of FIG. 15 is terminated.

The situation in which the on-board unit 1A receives the transmitter ID from the portable unit 3 occurs, for example, in case when an unauthorized person who does not carry the portable unit 3 tries to unlock a door from outside the vehicle after the user of the vehicle carrying the portable unit 3 has gotten into the vehicle and locked the doors. At this time, if the user in the vehicle accepts the person not carrying the portable unit 3 outside the vehicle and needs to unlock a door, the user in the vehicle can unlock the door by hand whereas if the person outside the vehicle is a suspicious person, the user can leave the door in a locked state without unlocking the door. Thus, in order to prevent a suspicious person from unlocking a door from outside the vehicle without permission, it is necessary to determine whether the portable unit 3 exists in the vehicle.

Moreover, in case where there are a plurality of portable units 3, it is possible to identify the individual portable units 3 by assigning inherent portable unit IDs to the portable units 3, respectively.

In this case, in the processing of transmitting the received data from the portable units 3 to the on-board unit 1 (steps S6 and S8), the portable units 3 send their portable unit IDs, which are inherent to themselves, to the on-board unit 1A, whereby the on-board unit 1A can identify, based on the portable unit IDs thus received, those of the portable units 3 which exist inside the vehicle and those of the portable units 3 which exist outside the vehicle.

In this case, when a user carrying a first portable unit 3 is going to unlock a door of the vehicle 5 from outside while another user carrying a second portable unit 3 has already gotten in the vehicle, the on-board unit 1A can permit the door of the vehicle 5 to be unlocked after having recognized that the first portable unit 3 exists outside the vehicle.

On the other hand, when a user with a portable unit 3 is going away from the vehicle 5, the electronic control unit 13 of the on-board unit 1A controls the on-board device 6 to automatically lock the doors of the vehicle 5 after having determined according to the above-mentioned determination processing (step S5) that there is no portable unit 3 in the vehicle.

The locking execution timing at this time is set to a time point at which a switch installed on the outer side of a door of the vehicle 5 is pressed, or a time point at which a signal from the portable unit 3 to the on-board unit 1A is interrupted or stopped.

In case where the locking execution timing is set based on the switching operation of the switch on the outer side of a door of the vehicle 5, when the switch outside the door is pressed, the door can be locked immediately after it is verified that the portable unit 3 does not exist in the vehicle 5.

Further, at this time, when the portable unit 3 exists in the vehicle 5, there is a possibility for the user to leave the portable unit 3 behind in the vehicle 5 despite going away therefrom, so the user can be assisted in finding the portable unit 3, for example, by sending a command from the on-board unit 1A to the portable unit 3 thereby to sound a buzzer 33 arranged in the portable unit 3. In this case, the portable unit 3 is constructed such that it is provided with the warning buzzer 33 and is also able to receive a command from the on-board unit 1A.

In addition, even in case where there are a plurality of portable units 3 and the user who is going away from the vehicle 5 carries a certain portable unit 3 with another portable unit 3 being left in the vehicle 5, it is possible to identify the portable unit 3 left in the vehicle 5 based on its inherent portable unit ID so that only the buzzer of the portable unit 3 in the vehicle 5 can be sounded.

On the other hand, in case where the locking execution timing is set based on a time point at which communication from a portable unit 3 to the on-board unit 1A is stopped or broken off, for instance, when intermittent communication, being executed from a portable unit 3 to the on-board unit 1A, is broken off after the engine of the vehicle 5 is stopped, the doors of the vehicle 5 can be locked. In this case, by adjusting the transmission power of the portable unit 3 so as to set a communicable range from the portable unit 3 to the on-board unit 1A to be about 3 meters to 5 meters, the doors of the vehicle 5 can automatically be locked even when the user carrying the portable unit 3 is away from the vehicle 5 without pressing a lock switch, and hence it becomes further effective from the standpoint of crime prevention.

As described above, according to the eighth embodiment of the present invention, a portable unit 3 has an inherent portable unit ID, and sends the portable unit ID therefrom to the on-board unit 1A through an ID communication section therein, and the on-board unit 1A makes, based on the portable unit ID received from the portable unit 3, a determination as to whether the portable unit 3 is a proper or appropriate one, and controls the on-board device 6 in accordance with the determination result thereof. As a result, when the user approaches the vehicle 5, the on-board unit 1A automatically unlocks a door at the instant when it receives a proper portable unit ID.

In addition, the on-board unit 1A radiates a radio wave to a portable unit 3, and the portable unit 3 generates electric power in response to the reception of the radio wave from the on-board unit 1A, so the power consumption of the portable unit 3 can be reduced.

Moreover, the portable unit 3 radiates a radio wave to an RF tag 2 (ID transmitter), and the RF tag 2 includes a power generation circuit that generates electric power in response to reception of the radio wave from the on-board unit 1A, and sends a transmitter ID possessed by itself by using the electric power generated from the power generation circuit. Accordingly, a battery built in the RF tag 2 can be reduced or eliminated.

Further, similarly as described above, the RF tag 2 may include a surface acoustic wave generation circuit that generates a surface acoustic wave in response to the reception of a radio wave from the portable unit 3, and if the RF tag 2 sends the transmitter ID possessed by itself by using the surface acoustic wave generated from the surface acoustic wave generation circuit, it is possible to suppress the output of the radio wave radiated from the portable unit 3 to the RF tag 2 to a low level.

Furthermore, as stated above, RF tags 2 (201-2n) are attached to or embedded in the surfaces of the interiors of the vehicle 5 so as to be arranged in appropriate positions, so that the communicable areas of the RF tags 2 can cover the entire indoor area of the vehicle 5, and the position of a portable unit 3 can be specified.

In addition, an indicator 50 for displaying the position of a portable unit 3 is installed on the indicator panel in the vehicle 5, and the on-board unit 1A specifies the position of the portable unit 3 based on a transmitter ID received from the portable unit 3, and displays it on the indicator 50. As a result, the portable unit 3 left behind by the user can be easily verified.

Moreover, if the portable unit 3 is provided with a receiving section (antenna 32) that receives a communication signal for warning from the on-board unit 1A and a warning section (buzzer 33) for generating a warning sound in response to the reception of the communication signal, the user can be given attention from the vehicle 5 when going away from the vehicle 5 with the portable unit 3 left behind in the passenger compartment of the vehicle 5, whereby crime prevention can be improved.

Embodiment 9

Although in the above-mentioned eighth embodiment, the RF tags 2 are arranged in the vicinity of the vehicle doors, respectively, in consideration of the control of individual door locking devices of the vehicle 5, at least one of the RF tags 2 may be installed in the vicinity of the driver's seat of the vehicle 5 in consideration of engine starter control.

Hereinafter, reference will be made to a ninth embodiment of the present invention in which an RF tag 2 (206) is installed in the vicinity of the driver's seat. Here, note that the state of arrangement or installation of the RF tag 206 on the vehicle 5 and the communicable area 406 of the RF tag 206 according to the ninth embodiment of the present invention are as shown in the above-mentioned FIG. 6 (plan view), but it is assumed that the on-board unit 1A is arranged in an arbitrary location in the passenger compartment of the vehicle 5. Here, not that the overall construction of a communication apparatus for a vehicle according to the ninth embodiment of the present invention is as shown in FIG. 14, but the on-board device 6 has an engine starting function, and is applied at the time of engine starting operation of the vehicle 5.

Next, the basic operation of the ninth embodiment of the present invention will be explained while referring to FIG. 6 and FIG. 14.

First of all, when a user carrying a portable unit 3 take a driver's seat 51 of the vehicle 5 and performs engine starting operation, a message for position verification is communicated from the on-board unit 1A to the portable unit 3, in response to which a radio wave is radiated from the portable unit 3 to the RF tag 206. As a result, the RF tag 206 receiving the radio wave from the portable unit 3 sends a transmitter ID held by itself.

At this time, if the user is in the driver's seat 51 with the portable unit 3 existing within the area 406, the portable unit 3 receives the transmitter ID of the RF tag 206 and communicates the received transmitter ID to the on-board unit 1A. Only when receiving the transmitter ID of the RF tag 206 from the portable unit 3, the on-board unit 1A controls the on-board device 6 (in this case, a starter device) so as to permit the starting of the engine. Thereafter, when the driver continues the engine starting operation, the engine is started.

Thus, by arranging at least one RF tag 206 among the plurality of RF tags 2 in the vicinity of the driver's seat 51 of the vehicle 5, the engine can be started only when an authorized user is in the driver's seat 51, i.e., when the existence area of the portable unit 3 is in the vicinity of the driver's seat 51. As a result, it is possible to prevent a person other than the authorized driver from falsely performing engine starting operation.

Embodiment 10

Although in the above-mentioned ninth embodiment, the RF tag 206 is arranged in the vicinity of the driver's seat 51 of the vehicle 5, RF tags 2 may be arranged outside the vehicle 5.

Figure 16:
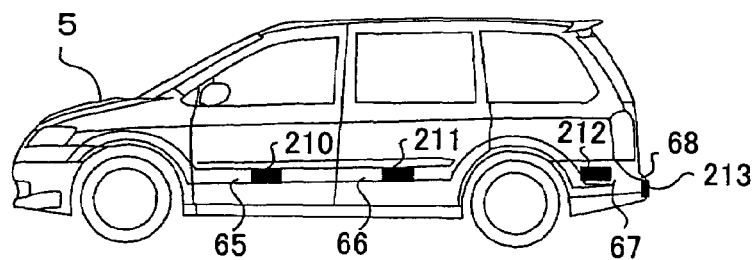
FIG. 16 is a side view schematically showing an example of installation of RF tags according to a tenth embodiment of the present invention.

Hereinafter, reference will be made to a tenth embodiment of the present invention in which RF tags 2 are arranged outside the vehicle 5. Here, note that the state of arrangement or installation of RF tags 207 through 213 on the vehicle 5 according to this tenth embodiment of the present invention is as shown in the above-mentioned FIG. 7 (plan view). FIG. 16 is a side view that schematically shows an example of installation of RF tags according to the tenth embodiment of the present invention. Though only RF tags 210, 211, 212, 213 are shown on one side surface (e.g., left side surface) of the vehicle 5 in FIG. 16, RF tags 207, 208, 209 are also installed at similar locations on the other side surface (e.g., right side surface) of the vehicle 5. In addition, though not illustrated, it is also assumed that RF tags 2 used to determine whether the portable unit 3 is in the vehicle 5 are arranged in respective places inside the vehicle 5.

In FIG. 16, the respective RF tags are individually installed in nonmetal parts outside of the vehicle 5. For instance, the RF tags 210 through 212 are installed on side protection molds 62-67 of the vehicle 5, respectively, and the RF tag 213 is installed on a bumper 68 in the rear end portion of the vehicle 5. Here, note that these RF tags can be installed on nonmetal parts at arbitrary locations other than illustrated, and it is assumed that an on-board unit 1A (not shown) is arranged in an arbitrary location in the passenger compartment of the vehicle 5, similarly as stated above.

Thus, by installing the RF tags 2 on the nonmetal parts outside the vehicle 5, the influence of metal on the RF tags 2 can be reduced, and the installation work of the RF tags 2 can be facilitated.

In addition, in case where the RF tags 2 are embedded in the side protection molds 62 through 67 and the bumper 68, there can be obtained an advantage that the RF tags 2 become less prone to be damaged by external impact and the aesthetic appearance of the vehicle 5 is not impaired.

Moreover, in case where RF tags 2 are installed outside the vehicle 5, a transmitter ID generated by an RF tag 2 upon reception of a radio wave from the portable unit 3 (see FIG. 14) is radiated to the outside of the vehicle 5, but does not reach the inside of the vehicle 5. Accordingly, at the instant when the portable unit 3 sends the transmitter ID received from the RF tag 2 to the on-board unit 1A, the on-board unit 1A can make a determination that the portable unit 3 exists outside the vehicle 5. Specifically, in FIG. 16, either of the RF tags 210 through 213 receives the radio wave radiated from the portable unit 3 and sends its transmitter ID to the portable unit 3, and the portable unit 3 receives the individual or inherent transmitter ID of the RF tag 2 and sends it to the on-board unit 1A.

Further, on the basis of the transmitter ID received from the portable unit 3, the on-board unit 1A can approximately limit not only the inside and outside position of the portable unit 3 with respect to the vehicle 5, but also the existence position of the portable unit 3 in the outside of the vehicle 5. For instance, when the portable unit 3 receives a transmitter ID from the RF tag 207, it is found that the portable unit 3 exists in the vicinity of the outside of a front right side seat of the vehicle 5. As a result, when a user carrying the portable unit 3 approaches the vehicle 5, as stated above (see the eighth embodiment), not only the locking of the doors of the vehicle 5 can be released in an automatic manner, but also the locking of a door alone in the vicinity of the existence position of the portable unit 3 can be automatically released. For instance, when a transmitter ID from the RF tag 210 is received from the portable unit 3, the electronic control unit 13 of the on-board unit 1A (see FIG. 14) controls the on-board device 6 so as to unlock only a door at a front left side seat of the vehicle 5.

Similarly, in the vehicle 5 with a rear opening and closing door such as a hatchback, etc., by installing the RF tag 213 in the vicinity of the center of the bumper 68 at the rear end portion of the vehicle 5, it is possible to automatically unlock the hatchback when it is determined that the portable unit 3 exists in the vicinity of the outside of the hatchback portion of the vehicle 5.

Thus, a crime prevention effect can be improved by unlocking only the door near the existence position of the portable unit 3, thereby making it possible to prevent a suspicious or unauthorized person from taking away something in the vehicle 5 from a door where the portable unit 3 (i.e., user) does not exist.

Embodiment 11

Although in the above-mentioned tenth embodiment, the RF tags 2 are installed on the side protection molds 62 through 67 and the bumper 68 of the vehicle 5, at least one RF tag 2 may be installed on a side visor (rain cover) portion of the vehicle 5.

Figure 17:
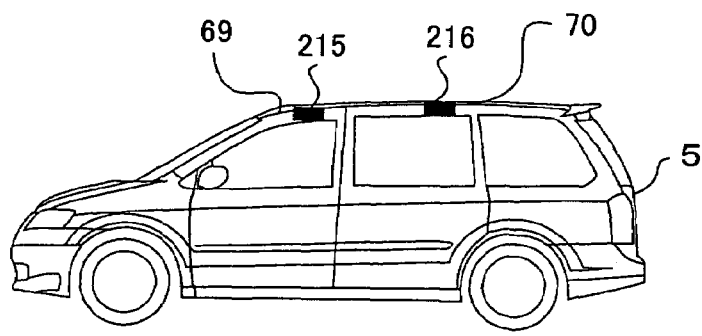
FIG. 17 is a plan view schematically showing an example of installation of RF tags according to an eleventh embodiment of the present invention.

Hereinafter, reference will be made to an eleventh embodiment of the present invention in which RF tags 2 are installed on side visor portions of the vehicle 5. FIG. 17 is a side view that schematically show an example of installation of RF tags 215, 216 according to the eleventh embodiment of the present invention, wherein the RF tags 215, 216 are installed on side visors 69, 70 at the left side of the vehicle 5. Though not illustrated herein, it is assumed that RF tags 2 are installed on side visors, respectively, at the right side of the vehicle 5, too. In addition, it is also assumed that RF tags 2 used to determine whether the portable unit 3 (see FIG. 14) is outside the vehicle 5 are arranged in respective places inside the vehicle 5.

Now, consideration is given, as an example, to the case where the portable unit 3 exists in the passenger compartment of the vehicle 5, and a window at a passenger's seat having been fully closed is opened so that the portable unit 3 is taken out from the vehicle 5 through an open space in the window.

In a state where the portable unit 3 is in the vehicle 5, a transmitter ID of either of RF tags (not shown) in the vehicle 5 is communicated from the portable unit 3 to the on-board unit 1A, so the on-board unit 1A is able to recognize that the portable unit 3 exists in the vehicle 5. At the time when a window pane of the vehicle 5 is opened to a certain extent and the portable unit 3 is taken to the outside from an open space in the window, the portable unit 3 enters the communicable area of the RF tag 215 (the coverage of its transmitter ID) installed on the side visor 69 at an upper portion of the window which is passed by the portable unit 3 itself, so the transmitter ID of the RF tag 215 is returned from the portable unit 3 to the on-board unit 1A. Thereafter, when the portable unit 3 is further moved to be carried out to the outside of the communicable area (the transmitter ID coverage) outside the vehicle 5, the portable unit 3 becomes unable to return the transmitter ID of the RF tag 215 to the on-board unit 1A.

Accordingly, by keeping track of the received state of the transmitter ID from the portable unit 3, the on-board unit 1A can make a, determination as to whether the portable unit 3 is carried out to the outside of the vehicle 5 through the window at the passenger's seat in the vicinity of the RF tag 215 installed on the side visor 69.

At this time, when the portable unit 3 is carried out to the outside of the vehicle 5, the on-board unit 1A can send a communication signal for warning to the portable unit 3, whereby a warning section (buzzer 33) of the portable unit 3 is driven to warn the user. As a result, the portable unit 3 put in a bag or the like for instance can be prevented from being taken out of a window of the vehicle 5 by mistake. Here, note that as the warning section for warning the taking out of the portable unit 3 to the outside of the vehicle, for instance, an indicator 50 (see FIG. 3) on an indicator panel in the vehicle 5 can be used to indicate the position of the portable unit 3.

Embodiment 12

Although in the above-mentioned eleventh embodiment (see FIG. 17), the RF tags 215, 216 are installed on the side visors 69, 70 of the vehicle 5, respectively, at least one RF tag 2 may be arranged on the interior of each door of the vehicle 5.

Figure 18:
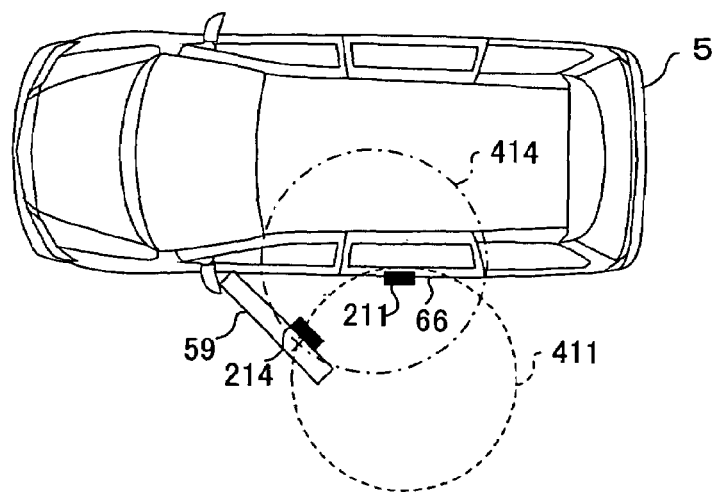
FIG. 18 is a plan view schematically showing an example of installation of RF tags according to a twelfth embodiment of the present invention.

Hereinafter, reference will be made to a twelfth embodiment of the present invention in which an RF tag 2 is installed on the interior of a door of the vehicle 5. FIG. 18 is a plan view that schematically shows an example of installation of an RF tag 214 on the vehicle 5 according to the twelfth embodiment of the present invention.

In FIG. 18, the RF tag 214 is installed on the interior of a door 59 of the vehicle 5, and has a communicable area 414. FIG. 18 shows that the door 59 with the RF tag 214 installed thereon is in its open state. In addition, an RF tag 211 similar to the above-mentioned one (see FIG. 16) is installed on an outer side (e.g., a side protection mold 66) of the vehicle 5, and has a communicable area 411. Though not illustrated herein, it is assumed that RF tags 2 are also arranged on the interiors of the other doors of the vehicle 5, respectively.

For instance, if a portable unit 3 (i.e., a user carrying the portable unit) is in the communicable area 414 in the vicinity of a passenger's seat or the left side of the vehicle 5, the portable unit 3 will receive the transmitter ID of the RF tag 214, and send it to the on-board unit 1A (see FIG. 14). Subsequently, if the portable unit 3 exists in the vehicle 5 at the time when the door 59 is opened, the on-board unit 1A will receive, from the portable unit 3, the transmitter ID of either of the RF tags 2 arranged in the vehicle 5.

Then, when the user moves together with the portable unit 3 to enter the communicable area 414, the on-board unit 1A comes to receive the transmitter ID of the RF tag 214. Thereafter, when the user with the portable unit 3 further moves to enter the communicable area 411 of the RF tag 211 while passing through the communicable area 414, the portable unit 3 receives the transmitter ID of the RF tag 211. As a result, the on-board unit 1A receives the transmitter ID of the RF tag 211 from the portable unit 3. Further, when the user with the portable unit 3 moves to the outside of the communicable area 411, the on-board unit 1A becomes unable to receive the transmitter ID from the portable unit 3.

Accordingly, by keeping track of the received state of the transmitter ID from the portable unit 3, the on-board unit 1A is able to make a determination as to whether the portable unit 3 is carried out of the vehicle 5 passing through the door 59. As a result, at the instant when the door 59 is closed, the user can know that the portable unit 3 has been carried out to the outside of the vehicle 5. At this time, when the portable unit 3 is carried out to the outside of the vehicle 5, the on-board unit 1A can send a communication signal for warning to the portable unit 3 to drive a warning section (buzzer 33) of the portable unit 3 to provide a warning to the user, whereby the portable unit 3 put in a bag or the like for instance can be prevented from being taken out of the door 59 of the vehicle 5 by mistake. Here, note that as the warning section for warning the taking out of the portable unit 3 to the outside of the vehicle, for instance, an indicator 50 (see FIG. 3) on an indicator panel in the vehicle 5 can be used to indicate the position of the portable unit 3.

Thus, according to the twelfth embodiment of the present invention, the position of the portable unit 3 can be grasped by communicating the transmitter ID of an RF tag 2 from the portable unit 3 to the on-board unit 1A, and the state of the portable unit 3 having been carried out to the outside of the vehicle 5 can be recognized by the use of the RF tag 214 installed on the interior of the door 59 and the RF tag 211 installed outside the vehicle 5.

In addition, intercommunication between the on-board unit 1A, the RF tags 2 and the portable unit 3 is achieved by contactless communication due to radio waves, so wiring between these elements becomes unnecessary, the degree of freedom of the installation positions thereof can be improved, thus making it possible to perform a determination of the position of the portable unit 3 (i.e., determination as to whether the portable unit 3 exists inside or outside the vehicle 5) in an easy manner.

Embodiment 13

Although in the above-mentioned seventh through twelfth embodiment, a transmitter ID received from an RF tag 2 is sent to the on-board unit 1A after the portable unit 3 activates the RF tag 2, an on-board unit may directly receive the transmitter ID of the RF tag 2.

Figure 19:
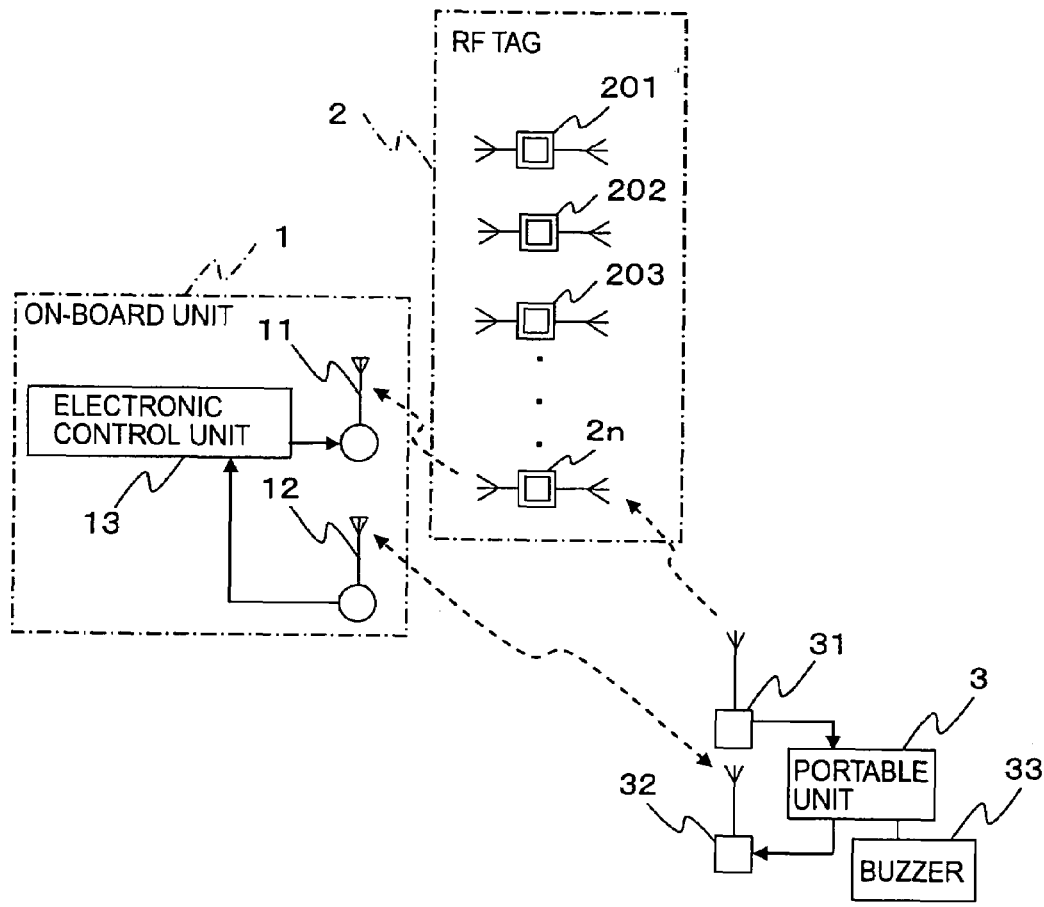
FIG. 19 is a block diagram showing the configuration of a communication apparatus for a vehicle according to a thirteenth embodiment of the present invention.
Figure 20:
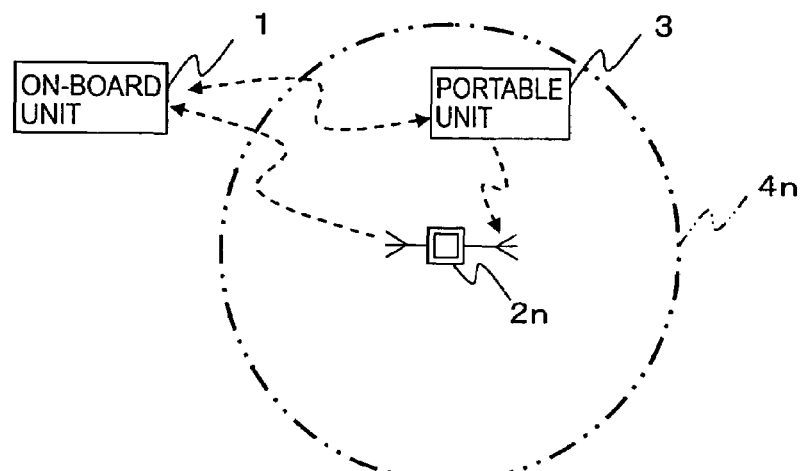
FIG. 20 is an explanatory view showing the relation between an on-board unit, an RF tag and a portable unit according to the thirteenth embodiment of the present invention.

Hereinafter, reference will be made to a thirteenth embodiment of the present invention which is constructed such that an on-board unit directly receives the transmitter ID of an RF tag 2, while mainly using FIGS. 19 and 20. FIG. 19 is a block diagram showing the configuration of a communication apparatus for a vehicle according to the thirteenth embodiment of the present invention.

In FIG. 19, the communication apparatus for a vehicle comprises an on-board unit 1, an RF tag 2 and a portable unit 3 which are communicable with one another, with the on-board unit 1 and the RF tags 2 being mounted on a vehicle.

The on-board unit 1 installed inside the vehicle is provided with an antenna 11 that directly receives a radio wave (transmitter ID) from the RF tag 2, an antenna 12 that receives a radio wave from the portable unit 3, and an electronic control unit 13 connected to the antennas 11,12.

The electronic control unit 13 determines (specifies) the position of the portable unit 3 based on a transmitter ID received from the antenna 11 so as to control respective parts of the vehicle, and also controls the sending and receiving of a radio wave through the antenna 12.

The antenna 12 may be constructed, for example, in such a manner that it sends a radio wave for power supply to the portable unit 3 and receives a radio wave (portable unit ID) from the portable unit 3. Here, note that the antennas 11, 12 may be constituted by the same transmitting and receiving antenna.

The RF tag 2 functions as an ID transmitter, and sends a transmitter ID possessed by itself in response to reception of a radio wave from the portable unit 3. Though herein is shown the case where the tag 2 comprises a plurality of RF tags (201, 202, 203, . . . 2n), a single RF tag may also be used (i.e., the "RF tag 2" is a generic term for both of the single RF tag and the plurality of RF tags). In addition, though around 900 MHz or around 2.45 GHz are suitable for the operation frequency of the RF tag 2 (201, 202, 203, . . . 2n), a high frequency band can be used and the RF tag operation frequency is not necessarily limited to these frequencies.

Moreover, though not illustrated, the RF tag 2 (201, 202, 203, . . . 2n) includes an antenna and an antenna circuit that receive the radio wave from the on-board unit 1, a voltage extraction circuit that takes out a voltage from the received radio wave, various circuits that are operated by the extracted voltage, and a transmitting circuit that sends a transmitter ID as a radio wave.

Further, the RF tag 2 may be comprised of an antenna that receives a radio wave from the on-board unit 1 and a surface acoustic wave generation circuit that generates a surface acoustic wave in response to reception of the radio wave from the on-board unit 1, and it may serve to send a transmitter ID possessed by itself by using the surface acoustic wave generated from the surface acoustic wave generation circuit. In this case, the RF tag 2 is replaced by the above-mentioned antenna and surface acoustic wave generation circuit, and the surface acoustic wave generation circuit is constructed in such a manner that it converts a radio wave received by the antenna into a surface acoustic wave thereby to generate a transmitter ID of a specific patter of n, and also converts the surface acoustic wave into a radio wave again to send the transmitter ID (see, for instance, the above-mentioned non-patent document). In case where the RF tag 2 uses a surface acoustic wave, the output power of a radio wave radiated from the on-board unit 1 to the RF tag 2 can be suppressed to a low level.

The on-board unit 1 and the portable unit 3 are designed in accordance with the frequency of the RF tag 2 used. The portable unit 3 is of a shape easy to be carried by a user, and is provided with an antenna 31 that sends a radio wave for power supply to the RF tag 2, an antenna 32 that sends and receives a radio wave (a communication signal, data, etc.) to and from the on-board unit 1, and a buzzer 33 that functions as a warning section.

For instance, the portable unit 3 may include a power generation circuit that is activated to generate electric power in response to the reception of a power supplying radio wave from the on-board unit 1, and as a result, the power consumption of the portable unit 3 and a battery built therein can be reduced.

In addition, the antennas 31, 32 may be constituted by the same transmitting and receiving antenna. Also, the antenna 32 of the portable unit 3 may constitute a communication section in association with the antenna 12 of the on-board unit 1, so that a portable unit ID or the like can be sent from the portable unit 3 to the on-board unit 1. Further, the RF tag 2 may be constituted by a surface acoustic wave generation circuit in place of the power generation circuit, as stated above.

Next, reference will be made to the schematic operation of the communication apparatus for a vehicle according to this thirteenth embodiment of the present invention as shown in FIG. 19.

First of all, the portable unit 3 radiates a radio wave to at least one RF tag 2 mounted in an appropriate place of the vehicle. An RF tag 2 generates electric power in response to the reception of the radio wave from the portable unit 3, and transmits or sends a transmitter ID possessed by itself by using the electric power thus generated. Finally, the on-board unit 1 determines the position of the portable unit 3 based on the transmitter ID received from the RF tag 2. In other words, it is determined whether the portable unit 3 exists inside or outside the vehicle.

Though the RF tag 2 functioning as an ID transmitter need only be a device that has a function to send an ID upon receipt of a radio wave from the outside, reference will be made herein to the case where RF tags 2 are used, as shown in FIG. 19.

Now, reference will be made to how electric power and data is transferred through radio waves among the on-board unit 1, the RF tags 2 and the portable unit 3.

First of all, the portable unit 3 supplies electric power to an RF tag 2n for instance by radiating a power supplying radio wave from the antenna 31. The RF tag 2n receiving the radio wave thus radiated has a voltage extraction section using a well-known prior art called a rectenna, and serves to rectify the received radio wave thereby to take out or extract a voltage, and to operate an internal circuit of the RF tag 2n by means of the extracted voltage, so that the transmitter ID held by the RF tag 2n is sent with a radio wave. At this time, a carrier wave used to send the transmitter ID can be supplied from the portable unit 3 or generated by internal oscillation of the RF tag 2n. Hereinafter, the on-board unit 1 directly receives the transmitter ID sent from the RF tag 2n.

Here, reference will be made to a communicable area between the RF tag 2n and the portable unit 3. FIG. 20 is an explanatory view that shows a communicable area 4n (the coverage of the transmitter ID) between the portable unit 3 and the RF tag 2n. In FIG. 20, a circle indicated by an alternate long and two short dashes line represents a range in which the RF tag 2n is able to send a transmitter ID in response to a radio wave radiated from the portable unit 3, i.e., the communicable area 4n in which the portable unit 3 can receive the transmitter ID of the RF tag 2n. The RF tag 2n can send a transmitter ID inherent to itself when the portable unit 3 exists inside the communicable area 4n of the RF tag 2n, but can not send it when the portable unit 3 exists outside the communicable area 4n.

The portable unit 3 existing in the communicable area 4n of the RF tag 2n sends a radio wave from the antenna 32 so as to activate the RF tag 2n, whereby the transmitter ID of the RF tag 2n is sent through a radio wave from the RF tag 2n to the on-board unit 1. The on-board unit 1 can receive, at the antenna 11, the transmitter ID sent from the RF tag 2n, and recognize based on the transmitter ID of the RF tag 2n that the portable unit 3 exists in the communicable area 4n of the RF tag 2n.

Next, reference will be made to the state of arrangement and the operation of RF tags 2 in case where the RF tags 2 are arranged in the interiors of the vehicle and it is determined whether the portable unit 3 exists in the vehicle. Here, note that the state of installation of the RF tags 201 through 205 to the vehicle 5 is as shown in the above-mentioned FIG. 3 (plan view), and the condition of installation, etc., of the RF tags 201 through 205 is also similar to that described above.

The RF tags 201 through 205 are installed, for example, on the interiors of door parts of the vehicle 5 so as to be at locations shown in FIG. 3, and the RF tags 201 through 205 have communicable areas 401 through 405, respectively, which cover the whole area in the vehicle 5 when overlapped with one another. That is, a first condition for the arrangement of the RF tags 201 through 205 is that they are installed or arranged so as to cover the whole area in the vehicle 5, as shown in FIG. 3.

Also, a setting condition for the communicable areas 401 through 405 (coverages of the individual transmitter IDs) of the individual RF tags 201 through 205 is given that the communicable areas 401 through 405 do not exist outside the vehicle 5. In other words, a second condition for the arrangement of the RF tags 201 through 205 is that the portable unit 3 existing outside the vehicle 5 (see FIGS. 19 and 20) can not communicate the RF tags 201 through 205.

In order to satisfy the first and second conditions for the arrangement of the RF tags 201 through 205, it is effective to install the RF tags 201 through 205 on the interiors lower than the window panes of the vehicle 5, for instance. However, as long as the first and second arrangement conditions are satisfied, neither the number nor the positions of the RF tags 201 through 205 may necessarily be identical with those which are shown in FIG. 3.

Here, note that the RF tags 201 through 205 may be attached to or stuck on the surfaces of the interiors of the vehicle 5, or may embedded in the interiors. In case where the RF tags 201 through 205 are attached to the surfaces of the interiors, the positions of attachment can be freely selected, so the above arrangement conditions can be readily satisfied. On the other hand, in case where the RF tags 201 through 205 are embedded in the interiors, there is an advantage that the aesthetic internal appearance of the vehicle 5 is not impaired and the RF tags 201 through 205 become resistant to damage due to external impact.

Further, in order to make uniform the communication states of the on-board unit 1 with the individual RF tags 201 through 205, the on-board unit 1 is arranged in such a manner that the distances of the on-board unit 1 from the individual RF tags 201 through 205 become as equal to one another as possible, as shown in FIG. 3.

In addition, if the covering range or coverage of the receiving antenna 11 in the on-board unit 1 includes all the RF tags 201 through 205, communications between the on-board unit 1 and the individual RF tags 201 through 205 can be executed at the same time, thus making it possible to improve communications efficiency.

In this manner, the RF tags 201 through 205 and the on-board unit 1 are arranged in the vehicle 5 so as to satisfy the above-mentioned conditions or requirements, whereby when the portable unit 3 exists in the communicable areas 401 through 405 of the RF tags 201 through 205, the RF tags 201 through 205 are activated to generate their transmitter IDs in response to a wave radiated from the portable unit 3 so that the on-board unit 1 can receive the transmitter IDs sent from the RF tags 201 through 205.

Accordingly, when the on-board unit 1 has directly received a transmitter ID from the RF tags 201 through 205, it can make a determination that the portable unit 3 exists in the vehicle 5. Also, in case where the user of the vehicle 5 is going away from the vehicle 5, it is determined, upon closure of a door of the vehicle 5 for example, whether the portable unit 3 exists in the vehicle 5, and the user can be informed of the determination result, for example, by driving the buzzer 33.

In addition, if the communicable areas 401 through 405 of the respective RF tags 201 through 205 with respect to the portable unit 3 are set so as to cover the whole area in the vehicle 5 with small overlapping areas formed between adjacent ones, the on-board unit 1 can specify, based on the received transmitter ID, the position in the vehicle in which the portable unit 3 exists.

As described above, according to the thirteenth embodiment of the present invention, the on-board unit 1 receives a transmitter ID which is sent from an RF tag 2 installed on the vehicle 5 in response to reception of a radio wave from the portable unit 3, whereby the on-board unit 1 can grasp the position of the portable unit 3 based on the transmitter ID received.

Moreover, by specifying the position of the portable unit 3 by means of the plurality of RF tags 2 and displaying it onto the indicator 50 on the indicator panel in the vehicle 5 for instance, it becomes possible for the user to easily find the portable unit 3 left behind in the vehicle 5.

Further, by separating the function of reading transmitter ID information into the portable unit 3 and the on-board unit 1 by the use of contactless communication due to radio waves of a high frequency band without depending on radio waves of an LF band that requires an expensive antenna, it is possible to achieve at low cost a communication apparatus for a vehicle which can make a determination as to whether the portable unit 3 exists inside or outside the vehicle 5.

Furthermore, since intercommunications between the on-board unit 1, the RF tags 2 and the portable unit 3 are all carried out through contactless communication by radio waves, wiring electrically connecting them to one another becomes unnecessary thereby to improve the degree of freedom of installation of the on-board unit 1 and the RF tags 2, and a determination can be easily made as to whether the portable unit 3 exists inside the vehicle 5.

Although the communication section for communication between the portable unit 3 and the on-board unit 1 has not been specifically referred to in the above description, it may be arranged in the portable unit 3 alone, or in both the on-board unit 1 and the portable unit 3. For instance, a carrier wave may be generated by using a battery in the portable unit 3, and modulated for communication to the on-board unit 1, or a carrier wave may instead be radiated from the on-board unit 1 to the portable unit 3, which then modulates the received carrier wave and returns it to the on-board unit 1. Further, a radio wave may be radiated from the on-board unit 1 to the portable unit 3, which may then extract a voltage from the received radio wave, generate a carrier wave by using the thus extracted voltage as a power supply, and modulate it for communicate to the on-board unit 1.

Embodiment 14

Although in the above-mentioned thirteenth embodiment, reference has been made only to the determination processing of the existence position of the portable unit 3 by means of the on-board unit 1 without referring to specific control on an on-board device (a door locking device, etc.) of the vehicle 5, such an on-board device installed on the vehicle may be controlled in accordance with the result of a determination as to whether the portable unit 3 is appropriate.

Figure 21:
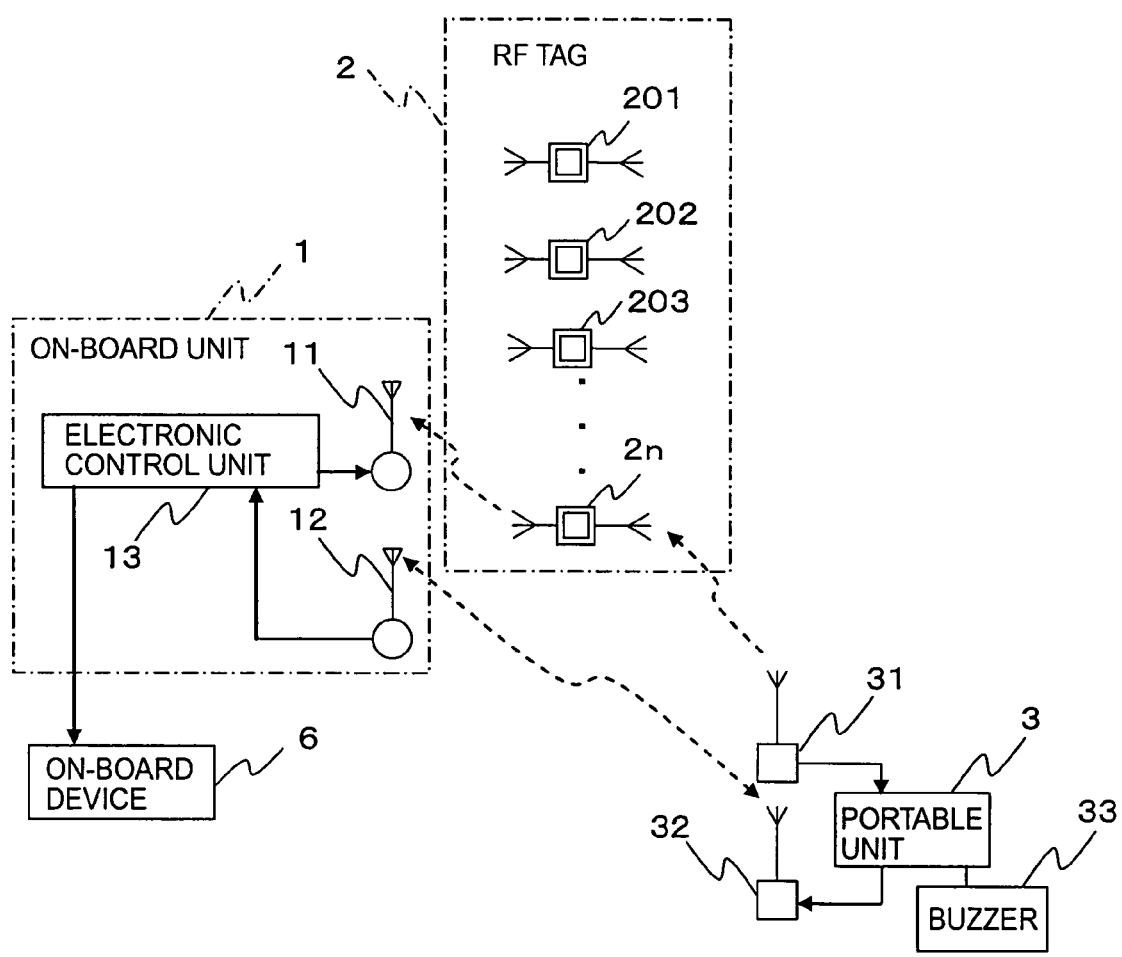
FIG. 21 is a block diagram showing the configuration of a communication apparatus for a vehicle according to a fourteenth embodiment of the present invention.

Hereinafter, reference will be made to a fourteenth embodiment of the present invention in which the on-board unit 1 is equipped with a function to control an on-board device. FIG. 21 is a block diagram that shows a communication apparatus for a vehicle according to this fourteenth embodiment of the present invention, in which the same or corresponding parts or elements as those as described above (see FIG. 19) are identified by the same symbols while omitting a detailed explanation thereof.

In FIG. 21, the electronic control unit 13 in the on-board unit 1 is connected to the on-board device 6 that controls doors or the like of the vehicle 5 (see FIG. 3). The on-board device 6 is not limited to a door locking device controlled from the on-board unit 1, but may be any device that is arranged or installed in the vehicle 5 for controlling a part of the vehicle 5.

In this case, the portable unit 3 has an inherent portable unit ID, and for instance, a communication section in the portable unit 3 sends its own portable unit ID from the antenna 32 of the portable unit 3 to the on-board unit 1. Alternatively, a portable unit ID may be sent from the antenna 11 of the portable unit 3 to the on-board unit 1 through an RF tag 2. As a result, the on-board unit 1 determines, based on the portable unit ID received from the portable unit 3 (or the RF tag 2), as to whether the portable unit 3 is an appropriate one, and controls the on-board device 6 in accordance with the result of the determination.

The on-board device 6 controls the locking, unlocking, etc., of the doors of the vehicle 5 in accordance with an instruction from the electronic control unit 13 of the on-board unit 1. For instance, when a user carrying a portable unit 3 approaches the vehicle 5, the on-board unit 1 verifies the existence of the portable unit 3 outside of the vehicle 5, and also verifies that the portable unit 3 is appropriate or proper, after which it unlocks the doors of the vehicle 5.

Hereinbelow, description will be given to the operation of the on-board unit 1 illustrated in FIG. 21 while referring to a flow chart in FIG. 22 together with FIG. 3. Here, reference will be made to the operation of the on-board unit 1 to control to unlock the doors of the vehicle 5 when the user carrying the portable unit 3 approaches the vehicle 5.

Figure 22:
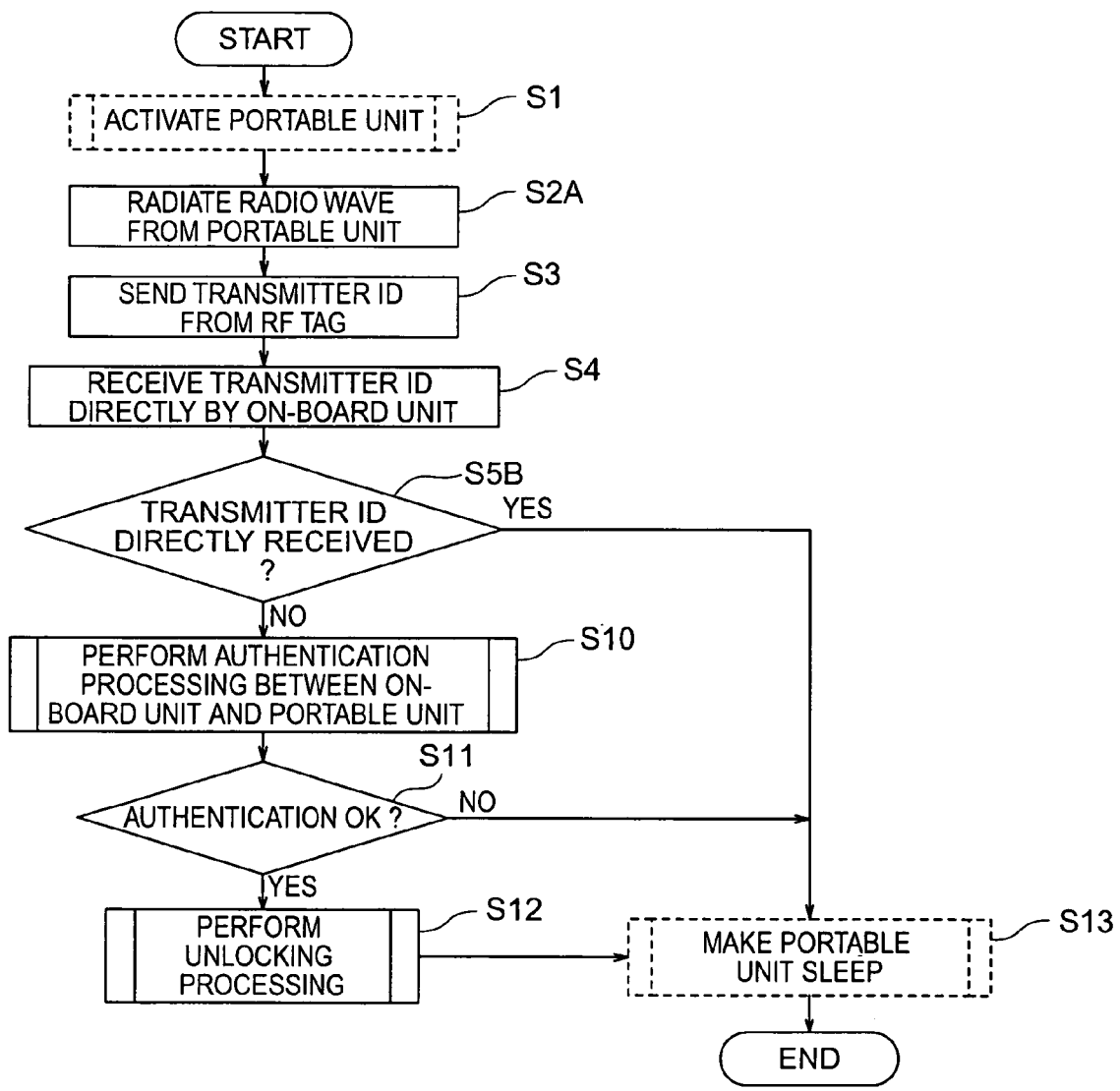
FIG. 22 is a flow chart illustrating door unlocking determination processing according to the fourteenth embodiment of the present invention.

In FIG. 22, first of all, when the user carrying the portable unit 3 approaches the vehicle 5, the portable unit 3 is activated (waked up) by a power supplying radio wave radiated from the on-board unit 1 in the vehicle 5, so that it is placed into a state in which it can send a power supplying radio wave to RF tags 2 (201-2n) (step S1). At this time, though the portable unit 3 may be in a standby state capable of always receiving a radio wave from the on-board unit 1 and sending a radio wave to the RF tags 2, it is desirable from the viewpoint of reduction of power consumption that the portable unit 3 be usually in a sleep state (a dormant state of extremely low power consumption) and activated only in the vicinity of the vehicle 5.

In addition, in step S1, though the portable unit 3 is activated in response to reception of an activation radio wave radiated from the on-board unit 1 in the vehicle 5, radiation timing of the radio wave from the on-board unit 1 may be set in such a manner that the on-board unit 1 always radiates the radio wave intermittently. Alternatively, it may be constructed from the viewpoint of reduction of power consumption such that an activation radio wave is radiated when a switch (not shown) installed on the outer side of a door of the vehicle 5 is pressed.

Subsequently, after radiating a power generating radio wave to supply electric power to the RF tags 2 (201-2n), the portable unit 3 radiates a radio wave comprising a carrier wave to the RF tags 2 (201-2n) (step S2A).

The RF tags 2 (201-2n) modulate the received carrier wave by means of their transmitter IDs by using the electric power supplied from the portable unit 3, whereby the transmitter IDs are sent therefrom to the on-board unit 1 (step S3).

Then, the on-board unit 1 is waiting for direct reception of a transmitter ID from an RF tag 2 to be approached by or near the portable unit 3 among the plurality of RF tags 2 (201-2n) (step S4), and makes a determination as to whether it has directly received a transmitter ID from an RF tag 2 to be approached by the portable unit 3 (step S5).

If it is determined in step S5B that the on-board unit 1 has not directly received a transmitter ID (that is, NO), the on-board unit 1 assumes that the portable unit 3 exists still outside the vehicle, and executes the authentication processing of the portable unit 3 between the on-board unit 1 and the portable unit 3 (step S10). The processing in step S10 (determination as to whether the combination of the portable unit 3 and the on-board unit 1 is correct) is executed by an authentication processing section that is included in the electronic control unit 13 of the on-board unit 1. That is, in step S10, a comparison is made between the portable unit ID inherent to the portable unit 3 and an ID beforehand registered in the on-board unit 1 to verify whether both of them coincides with each other.

Next, the authentication processing section in the electronic control unit 13 determines, based on the authentication result in step S10, whether the combination of the portable unit 3 and the on-board unit 1 is correct (authentication is OK) (step S11), and only when it is determined that both of them are a correct pair or set and hence the authentication is OK (that is, YES), the on-board device 6 is controlled to perform the door unlocking processing of the vehicle 5 (step S12).

Finally, after the door unlocking processing (step S12), the electronic control unit 13 performs sleep processing to shift the portable unit 3 to a dormant state so as to serve for the purpose of reduction of power consumption (step S13), and the processing routine of FIG. 22 is terminated. Alternatively, if the electric power of the portable unit 3 has extra margin or capacity, the portable unit 3 can be placed in a standby state capable of intermittently communicating with the on-board unit 1 without performing sleep processing (step S13).

On the other hand, when it is determined in step S11 (authentication processing) that the combination of the portable unit 3 and the on-board unit 1 is not collect (that is, NO), the control flow advances to the sleep processing of the portable unit 3 (step S13) at once, and the processing routine of FIG. 22 is terminated.

If it is determined in the above-mentioned step S5B that the on-board unit 1 has directly received a transmitter ID (that is, YES), the on-board unit 1 recognizes that the portable unit 3 exists in the vehicle, and can also recognize, from the received transmitter ID, the approximate position of the portable unit 3 in the vehicle.

Hereinafter, when it is determined from the direct reception of the transmitter ID from the RF tag 2 that the portable unit 3 exists in the vehicle, the electronic control unit 13 in the on-board unit 1 assumes that there is no need to unlock the doors of the vehicle 5, and shifts to the sleep processing of the portable unit 3 (step S13) without performing door unlocking processing (step S12), after which the processing routine of FIG. 22 is terminated.

The situation in which the on-board unit 1 receives a transmitter ID from an RF tag 2 occurs, for example, in case when an unauthorized person who does not carry the portable unit 3 tries to unlock a door from outside the vehicle after the user of the vehicle carrying the portable unit 3 has gotten into the vehicle and locked the doors. At this time, if the user in the vehicle accepts the person not carrying the portable unit 3 outside the vehicle and needs to unlock a door, the user in the vehicle can unlock the door by hand, whereas if the person outside the vehicle is a suspicious person, the user can leave the door in a locked state without unlocking the door. Thus, in order to prevent a suspicious person from unlocking a door from outside the vehicle without permission, it is necessary to determine whether the portable unit 3 exists in the vehicle.

Moreover, in case where there are a plurality of portable units 3, it is possible to identify the individual portable units 3 by assigning inherent portable unit IDs to the portable units 3, respectively.

In this case, it becomes possible for the on-board unit 1 to identify, by reception processing of ID data (transmitter IDs or portable unit IDs) (steps S4 and S10), which ones among the plurality of portable units 3 exist inside the vehicle and which ones exist outside the vehicle. In other words, the on-board unit 1 can identify, based on the portable unit IDs received from the portable units 3, those of the portable units 3 which exist inside the vehicle and those which exist outside the vehicle from each other.

Accordingly, when a user carrying a first portable unit 3 is going to unlock a door of the vehicle 5 from outside while another user carrying a second portable unit 3 has already gotten in the vehicle, the on-board unit 1 can permit the door of the vehicle 5 to be unlocked after having recognized that the first portable unit 3 exists outside the vehicle. On the other hand, when a user with a portable unit 3 is going away from the vehicle 5, the electronic control unit 13 of the on-board unit 1 controls the on-board device 6 to automatically lock the doors of the vehicle 5 after having determined according to the above-mentioned determination processing (step S5) that there is no portable unit 3 in the vehicle 5.

The locking execution timing at this time is set to a time point at which a switch installed on the outer side of a door of the vehicle 5 is pressed, or a time point at which a signal from the portable unit 3 to the on-board unit 1 is interrupted or stopped. In case where the locking execution timing is set based on the switching operation of the switch on the outer side of a door of the vehicle 5, when the switch outside the door is pressed, the door can be locked immediately after it is verified that no portable unit 3 exists in the vehicle 5.

Further, at this time, when a portable unit 3 exists in the vehicle 5, there is a possibility for the user to leave the portable unit 3 behind in the vehicle 5 despite going away therefrom, so the user can be assisted in finding the portable unit 3, for example, by sending a command from the on-board unit 1 to the portable unit 3 thereby to sound a buzzer arranged in the portable unit 3. In this case, the portable unit 3 is constructed such that it is provided with a warning buzzer 33 and is also able to receive a command from the on-board unit 1.

In addition, even in case where there are a plurality of portable units 3 and the user who is going away from the vehicle 5 carries a certain portable unit 3 with another portable unit 3 being left in the vehicle 5, it is possible to identify the portable unit 3 left in the vehicle 5 based on its inherent portable unit ID so that only the buzzer of the portable unit 3 in the vehicle 5 can be sounded.

On the other hand, in case where the locking execution timing is set based on a time point at which communication from a portable unit 3 to the on-board unit 1 is stopped or broken off, for instance, when intermittent communication, being executed from the portable unit 3 to the on-board unit 1, is broken off after the engine of the vehicle 5 is stopped, the doors of the vehicle 5 can be locked.

In this case, by adjusting the transmission power of the portable unit 3 so as to set a communicable range from the portable unit 3 to the on-board unit 1 to be about 3 meters to 5 meters, the doors of the vehicle 5 can automatically be locked even when the user carrying the portable unit 3 is away from the vehicle 5 without pressing a lock switch, and hence it becomes further effective from the standpoint of crime prevention.

As described above, according to this fourteenth embodiment of the present invention, a portable unit 3 has an inherent portable unit ID, and sends the portable unit ID therefrom to the on-board unit 1 through an ID communication section therein, and the on-board unit 1 makes, based on the portable unit ID received from the portable unit 3, a determination as to whether the portable unit 3 is a proper or appropriate one, and controls the on-board device 6 in accordance with the determination result thereof. As a result, when the user approaches the vehicle 5, the on-board unit 1 automatically unlocks a door at the instant when it receives a proper portable unit ID.

In addition, the on-board unit 1 radiates a radio wave to a portable unit 3, and the portable unit 3 generates electric power in response to the reception of the radio wave from the on-board unit 1, so the power consumption of the portable unit 3 can be reduced.

Moreover, the portable unit 3 radiates a radio wave to an RF tag 2 (ID transmitter), and the RF tag 2 includes a power generation circuit that generates electric power in response to reception of the radio wave from the portable unit 3, and sends a transmitter ID possessed by itself by using the electric power generated from the power generation circuit. Accordingly, a battery built in the RF tag 2 can be reduced or eliminated.

Further, similarly as described above, an RF tag 2 may include a surface acoustic wave generation circuit that generates a surface acoustic wave in response to the reception of a radio wave from the portable unit 3, and if the RF tag 2 sends the transmitter ID possessed by itself by using the surface acoustic wave generated from the surface acoustic wave generation circuit, it is possible to suppress the output of the radio wave radiated from the portable unit 3 to the RF tag 2 to a low level.

Furthermore, as stated above, RF tags 2 (201-2n) are attached to or embedded in the surfaces of the interiors of the vehicle 5 so as to be arranged in appropriate positions. Accordingly, the communicable areas of the RF tags 2 can cover the entire indoor area of the vehicle 5, so that the position of a portable unit 3 can be specified.

In addition, by using an indicator 50 on an indicator panel installed in the vehicle 5 for displaying the position of a portable unit 3, the on-board unit 1 specifies the position of the portable unit 3 based on a transmitter ID received from the portable unit 3, and displays it on the indicator 50. As a result, the user can easily confirm or verify a portable unit 3 left behind in the vehicle.

Moreover, if a portable unit 3 is provided with a receiving section that receives a warning communication signal from the on-board unit 1 and a warning section (buzzer) for generating a warning sound in response to reception of the communication signal, the user can be given attention from the vehicle 5 when going away from the vehicle 5 with the portable unit 3 left behind in the passenger compartment of the vehicle 5, whereby crime prevention can be improved.

Embodiment 15

Although in the above-mentioned fourteenth embodiment, the RF tags 2 are arranged in the vicinity of the vehicle doors, respectively, in consideration of the control of the door locking devices of the vehicle 5, at least one of the RF tags 2 may be installed in the vicinity of the driver's seat of the vehicle 5 in consideration of engine starter control.

Hereinafter, reference will be made to a fifteenth embodiment of the present invention in which an RF tag 2 is installed in the vicinity of the driver's seat. Here, note that the arrangement or installation state of an RF tag 206 on the vehicle 5 and a communicable area 406 thereof according to the fifteenth embodiment of the present invention are as shown in the above-mentioned FIG. 6 (plan view). Also, the overall construction of a communication apparatus for a vehicle according to the fifteenth embodiment of the present invention is as shown in FIG. 21, but the on-board device 6 has an engine starting function, and is applied at the time of engine starting operation of the vehicle 5.

Next, the operation of this fifteenth embodiment of the present invention will be explained while referring to FIG. 21 together with FIG. 6.

First of all, when a user carrying a portable unit 3 take a driver's seat 51 of the vehicle 5 and performs engine starting operation, a message for position verification is communicated from the on-board unit 1 to the portable unit 3, in response to which a radio wave is radiated from the portable unit 3 to the RF tag 206.

At this time, if the portable unit 3 exists in the communicable area 406, the RF tag 206 receives the radio wave sent from the portable unit 3, and sends a transmitter ID held by itself is sent to the on-board unit 1. That is, if the user is in the driver's seat 51 and the portable unit 3 exists within the area 406, the on-board unit 1 will directly receive the transmitter ID of the RF tag 206. Only when having directly received the transmitter ID of the RF tag 206, the on-board unit 1 controls the on-board device 6 (in this case, a starter device) so as to permit the starting of the engine. Thereafter, when the driver continues the engine starting operation, the engine is started.

Thus, by arranging at least one RF tag 206 among the plurality of RF tags 2 in the vicinity of the driver's seat 51 of the vehicle 5, the engine can be started only when an authorized user is in the driver's seat 51, i.e., when the existence area of the portable unit 3 is in the vicinity of the driver's seat 51. As a result, it is possible to prevent a person other than the authorized driver from falsely performing engine starting operation.

Embodiment 16

Although in the above-mentioned fifteenth embodiment, the RF tag 206 is arranged in the vicinity of the driver's seat 51 of the vehicle 5, at least one RF tag 2 may be arranged on each window pane of the vehicle 5.

Hereinafter, reference will be made to a sixteenth embodiment of the present invention in which an RF tag 2 is installed on the interior of a door of the vehicle 5. Here, note that the arrangement or installation state of an RF tag 214 on the vehicle 5 and a communicable area 414 thereof according to the sixteenth embodiment of the present invention are as shown in the above-mentioned FIG. 9 (plan view). That is, the RF tag 214 is installed on the interior of a door 59 of the vehicle 5, and has the communicable area 414. In addition, it is assumed that RF tags 2 are also arranged on the interiors of the other doors of the vehicle 5, respectively. In FIG. 9, the door 59 with the RF tag 214 installed thereon is shown in its open state.

First, let us assume that a user having a portable unit 3 (see FIG. 21) is in the vicinity of a passenger's seat or the left side of the vehicle 5 with the door 59 closed, and the portable unit 3 exists in the communicable area 414. At this time, the RF tag 214 that receives a radio wave from the portable unit 3 sends its own transmitter ID to the on-board unit 1, so that the on-board unit 1 will directly receive the transmitter ID of the RF tag 214.

On the other hand, in case where the portable unit 3 is in some place inside the vehicle 5 at the time when the door 59 is opened as shown in FIG. 9, the on-board unit 1 will receive the transmitter ID of another RF tag 2 (not shown) arranged in the vehicle 5. Thereafter, when the user moves together with the portable unit 3 to enter the communicable area 414, the on-board unit 1 comes to directly receive the transmitter ID of the RF tag 214. Further, when the user with the portable unit 3 gets out of the vehicle 5 while passing through the communicable area 414, the on-board unit 1 becomes unable to receive a transmitter ID from the RF tag 214. Accordingly, by keeping track of the received state of a transmitter ID, the on-board unit 1 is able to make a determination as to whether the portable unit 3 is carried out of the vehicle 5 passing through the door 59.

As described above, according to the sixteenth embodiment of the present invention, since at least one of the plurality of RF tags 2 is installed on the interior of each door of the vehicle 5, the on-board unit 1 is able to immediately recognize that the portable unit 3 has been taken out of the vehicle 5 at the instant when the user carrying the portable unit 3 gets out of the vehicle 5 and closes the door 59.

In addition, by informing the user of the existence of the portable unit 3 outside the vehicle 5 at the timing when the portable unit 3 has been carried out of the vehicle 5, it is possible to prevent the user from carrying the portable unit 3 out of the vehicle 5 by mistake with the portable unit 3 put in a bag or the like for example. As a means for warning at this time, such information or warning may be displayed on an indicator 50 on an indicator panel of the vehicle 5, or a buzzer 33 installed on the portable unit 3 may be sounded.

Moreover, similarly as stated above, the plurality of RF tags 2 installed on the vehicle 5 send their inherent transmitter IDs beforehand held by themselves to the on-board unit 1 in response to reception of a radio wave from the portable unit 3 approaching the vehicle 5, whereby the on-board unit 1 can grasp the position of the portable unit 3 based on the transmitter IDs directly received from the RF tags 2.

Further, all communications among the on-board unit 1, the RF tags 2 and the portable unit 3 can be achieved by contactless communication due to radio waves. As a result, wiring between these elements becomes unnecessary, the degree of freedom of the installation positions thereof can be improved, thus making it possible to achieve the determination of the position of the portable unit 3 in an easy manner.

While the invention has been described in terms of preferred embodiments, those skilled in the art will recognize that the invention can be practiced with modifications within the spirit and scope of the appended claims.

What is claimed is:

1. A communication apparatus for a vehicle comprising:
   at least one ID transmitter that is installed on a vehicle and sends a transmitter ID possessed by itself in response to reception of a radio wave;
   an on-board unit that is installed on said vehicle and radiates said radio wave to said ID transmitter;
   a portable unit that receives said transmitter ID sent by said ID transmitter; and
   an ID communication section that sends said transmitter ID from said portable unit to said on-board unit;
   wherein said on-board unit determines the position of said portable unit based on said transmitter ID received from said portable unit.

2. The communication apparatus for a vehicle as set forth in claim 1, wherein
   said portable unit has an inherent portable unit ID;
   said ID communication section sends said portable unit ID from said. portable unit to said on-board unit; and
   said on-board unit determines, based on said portable unit ID received from said portable unit, whether said portable unit is a proper one, and controls an on-board device installed on said vehicle in accordance with the result of the determination as to whether said portable unit is a proper one.

3. The communication apparatus for a vehicle as set forth in claim 1, wherein
   said on-board unit radiates a radio wave to said portable unit; and
   said portable unit generates electric power in response to reception of said radio wave from said on-board unit.

4. The communication apparatus for a vehicle as set forth in claim 1, wherein
   said on-board unit radiates a radio wave to said ID transmitter; and
   said ID transmitter includes a power generation circuit that generates electric power in response to reception of said radio wave from said on-board unit, and sends said transmitter ID possessed by itself by using the electric power generated from said power generation circuit.

5. The communication apparatus for a vehicle as set forth in claim 1, wherein
   said ID transmitter includes a surface acoustic wave generation circuit that generates a surface acoustic wave in response to reception of a radio wave from said on-board unit, and sends said transmitter ID possessed by itself by using said surface acoustic wave generated from said surface acoustic wave generation circuit.

6. The communication apparatus for a vehicle as set forth in claim 1, wherein
   said ID transmitter is installed on an interior of said vehicle.

7. The communication apparatus for a vehicle as set forth in claim 6, wherein
   said ID transmitter includes a plurality of ID transmitters, and at least one of said plurality of ID transmitters is installed on an interior of each door of said vehicle.

8. The communication apparatus for a vehicle as set forth in claim 1, wherein
said ID transmitter includes a plurality of ID transmitters, and at least one of said plurality of ID transmitters is installed in the vicinity of a driver's seat of said vehicle.

9. The communication apparatus for a vehicle as set forth in claim 1, wherein
said ID transmitter is installed on a window pane of said vehicle.

10. The communication apparatus for a vehicle as set forth in claim 9, wherein
said ID transmitter includes a plurality of ID transmitters, and at least one of said plurality of ID transmitters is installed on each of right and left window panes of said vehicle.

11. The communication apparatus for a vehicle as set forth in claim 9, wherein
said ID transmitter includes a plurality of ID transmitters, and at least one of said plurality of ID transmitters is installed on an upper portion of a movable window pane of said vehicle.

12. A communication apparatus for a vehicle comprising:
at least one ID transmitter that is installed on a vehicle and sends a transmitter ID possessed by itself in response to reception of a radio wave;
an on-board unit installed on said vehicle;
a portable unit that radiates a radio wave to said ID transmitter and receives a transmitter ID generated by said ID transmitter; and
an ID communication section that sends said transmitter ID from said portable unit to said on-board unit;
wherein said on-board unit determines the position of said portable unit based on said transmitter ID received from said portable unit.

13. The communication apparatus for a vehicle as set forth in claim 12, wherein
said portable unit has an inherent portable unit ID;
said ID communication section sends said transmitter ID from said portable unit to said on-board unit; and said on-board unit determines, based on said portable unit ID received from said portable unit, whether said portable unit is a proper one, and controls an on-board device installed on said vehicle in accordance with the result of the determination as to whether said portable unit is a proper one.

14. The communication apparatus for a vehicle as set forth in claim 12, wherein
said on-board unit radiates a radio wave to said portable unit; and
said portable unit generates electric power in response to reception of said radio wave from said on-board unit.

15. The communication apparatus for a vehicle as set forth in claim 12, wherein
said ID transmitter includes a power generation circuit that generates electric power in response to reception of said radio wave from said portable unit, and sends said transmitter ID possessed by itself by using the electric power generated from said power generation circuit.

16. The communication apparatus for a vehicle as set forth in claim 12, wherein
said ID transmitter includes a surface acoustic wave generation circuit that generates a surface acoustic wave in response to reception of a radio wave from said portable unit, and sends said transmitter ID possessed by itself by using said surface acoustic wave generated from said surface acoustic wave generation circuit.

17. The communication apparatus for a vehicle as set forth in claim 12, wherein
said ID transmitter is installed on an interior of said vehicle.

18. The communication apparatus for a vehicle as set forth in claim 17, wherein
said ID transmitter includes a plurality of ID transmitters, and at least one of said plurality of ID transmitters is installed on an interior of each door of said vehicle.

19. The communication apparatus for a vehicle as set forth in claim 12, wherein
said ID transmitter includes a plurality of ID transmitters, and at least one of said plurality of ID transmitters is installed in the vicinity of a driver's seat of said vehicle.

20. The communication apparatus for a vehicle as set forth in claim 12, wherein
said ID transmitter is installed on an outer portion of said vehicle.

21. The communication apparatus for a vehicle as set forth in claim 20, wherein
said ID transmitter is installed on a nonmetal part of said vehicle.

22. A communication apparatus for a vehicle comprising:
at least one ID transmitter that is installed on a vehicle and sends a transmitter ID possessed by itself in response to reception of a radio wave;
a portable unit that radiates a radio wave to said ID transmitter; and
an on-board unit that is installed on said vehicle and receives said transmitter ID generated by said ID transmitter:
wherein said on-board unit determines the position of said portable unit based on said transmitter ID received from said ID transmitter.

23. The communication apparatus for a vehicle as set forth in claim 22, wherein
said portable unit radiates an inherent portable unit ID beforehand possessed by itself; and
said on-board unit determines, based on said portable unit ID received from said portable unit, whether said portable unit is a proper one, and controls an on-board device installed on said vehicle in accordance with the result of the determination as to whether said portable unit is a proper one.

24. The communication apparatus for a vehicle as set forth in claim 22, wherein
said on-board unit radiates a radio wave to said portable unit; and
said portable unit includes a power generation circuit that generates electric power in response to reception of said radio wave from said on-board unit.

25. The communication apparatus for a vehicle as set forth in claim 22, wherein
said ID transmitter includes a power generation circuit that generates electric power in response to reception of said radio wave from said portable unit, and sends said transmitter ID possessed by itself by using the electric power generated from said power generation circuit.

26. The communication apparatus for a vehicle as set forth in claim 22, wherein
said ID transmitter includes a surface acoustic wave generation circuit that generates a surface acoustic wave in response to reception of said radio wave from said portable unit, and sends said transmitter ID possessed by itself by using said surface acoustic wave generated from said surface acoustic wave generation circuit.

27. The communication apparatus for a vehicle as set forth in claim 22, wherein
   said ID transmitter is installed on an interior of said vehicle.

28. The communication apparatus for a vehicle as set forth in claim 27, wherein
   said ID transmitter includes a plurality of ID transmitters, and at least one of said plurality of ID transmitters is installed on an interior of each door of said vehicle.

29. The communication apparatus for a vehicle as set forth in claim 22, wherein
   said ID transmitter includes a plurality of ID transmitters, and at least one of said plurality of ID transmitters is installed on in the vicinity of a driver's seat of said vehicle.

* * * * *